United States Patent [19]

Nally et al.

[11] Patent Number: 4,490,853
[45] Date of Patent: Dec. 25, 1984

[54] MATRIX CHARACTER READING SYSTEM

[75] Inventors: Robert B. Nally, Waterloo; Eric J. Vance, Kitchener; Patrick C. Leung; James F. Akister, both of Waterloo, all of Canada

[73] Assignee: NCR Corporation, Dayton, Ohio

[21] Appl. No.: 331,946

[22] Filed: Dec. 17, 1981

[51] Int. Cl.³ .............................................. G06K 9/20
[52] U.S. Cl. .......................................... 382/48; 382/7
[58] Field of Search ........................... 382/7, 9, 48, 64

[56] References Cited

U.S. PATENT DOCUMENTS

| | | | |
|---|---|---|---|
| 3,526,876 | 9/1970 | Baumgartner et al. | 382/9 |
| 3,535,682 | 10/1970 | Dykaar et al. | 382/7 |
| 3,992,697 | 11/1976 | Knab et al. | 382/48 |
| 4,206,442 | 6/1980 | Miyazaki et al. | 382/9 |
| 4,277,776 | 7/1981 | Nally et al. | 382/48 |

Primary Examiner—Leo H. Boudreau
Attorney, Agent, or Firm—J. T. Cavender; Wilbert Hawk, Jr.; Richard W. Lavin

[57] ABSTRACT

A method and apparatus for selecting the start of an unknown character sensed by a character recognition system. A multi-channel read head develops a plurality of analog waveforms which form the image of an unknown character sensed by the read head. After the analog waveforms have been digitized and rectified, static and dynamic threshold values are applied producing a multi-column binary bit map of the unknown character. The start of the character is detected when two adjacent rows of the bit map are found to have five consecutive binary bits representing a character. The end of the character is detected when the rows of the binary bits representing background data have a width which is inversely proportional to the width of the character detected. This information is used by a character recognition apparatus in locating the start of the character and the data generated during a character recognition operation.

17 Claims, 52 Drawing Figures

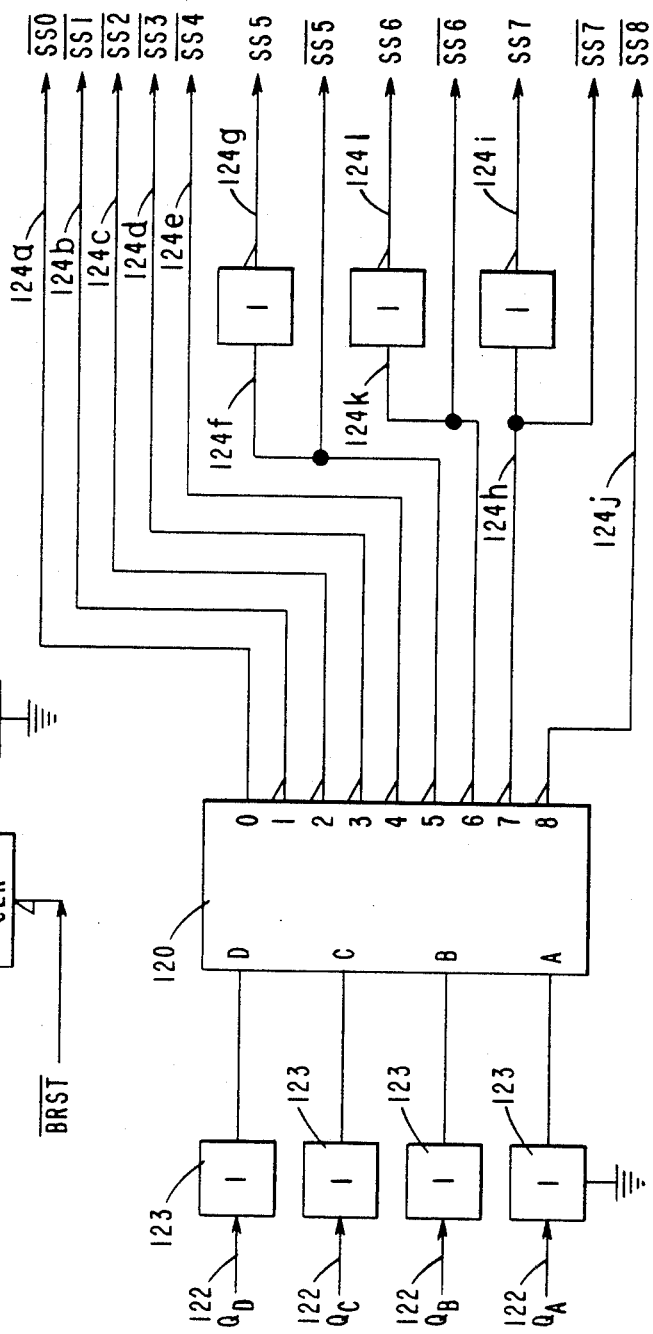

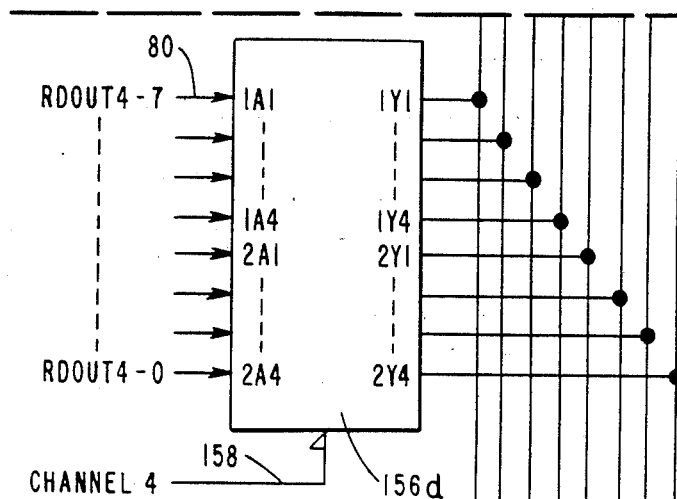
FIG.11B
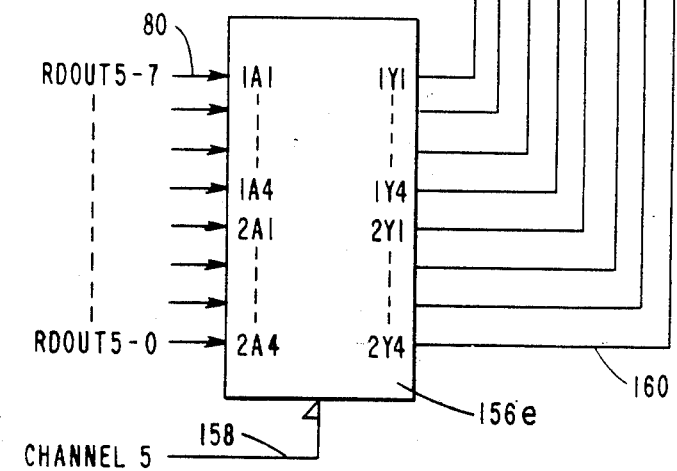
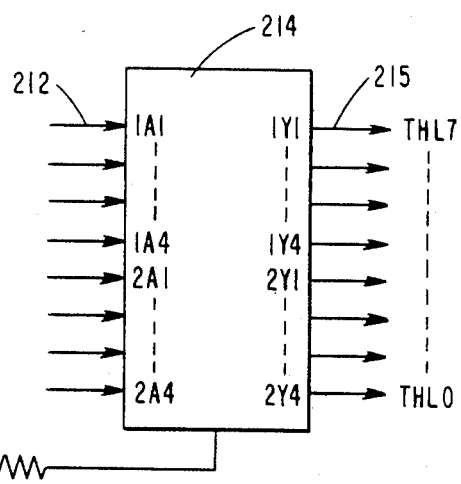
FIG.12

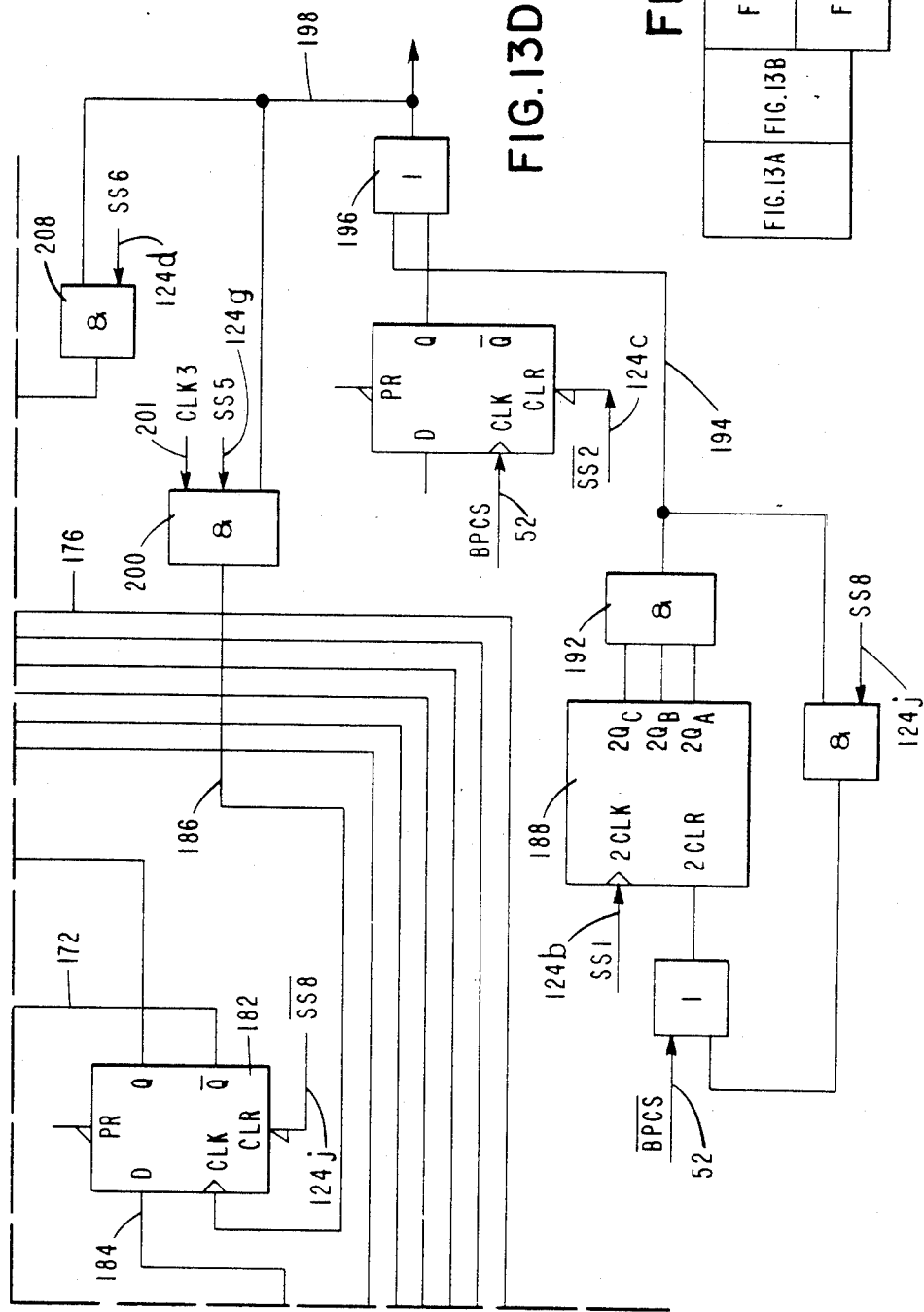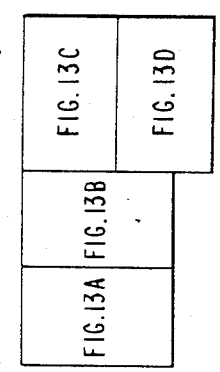

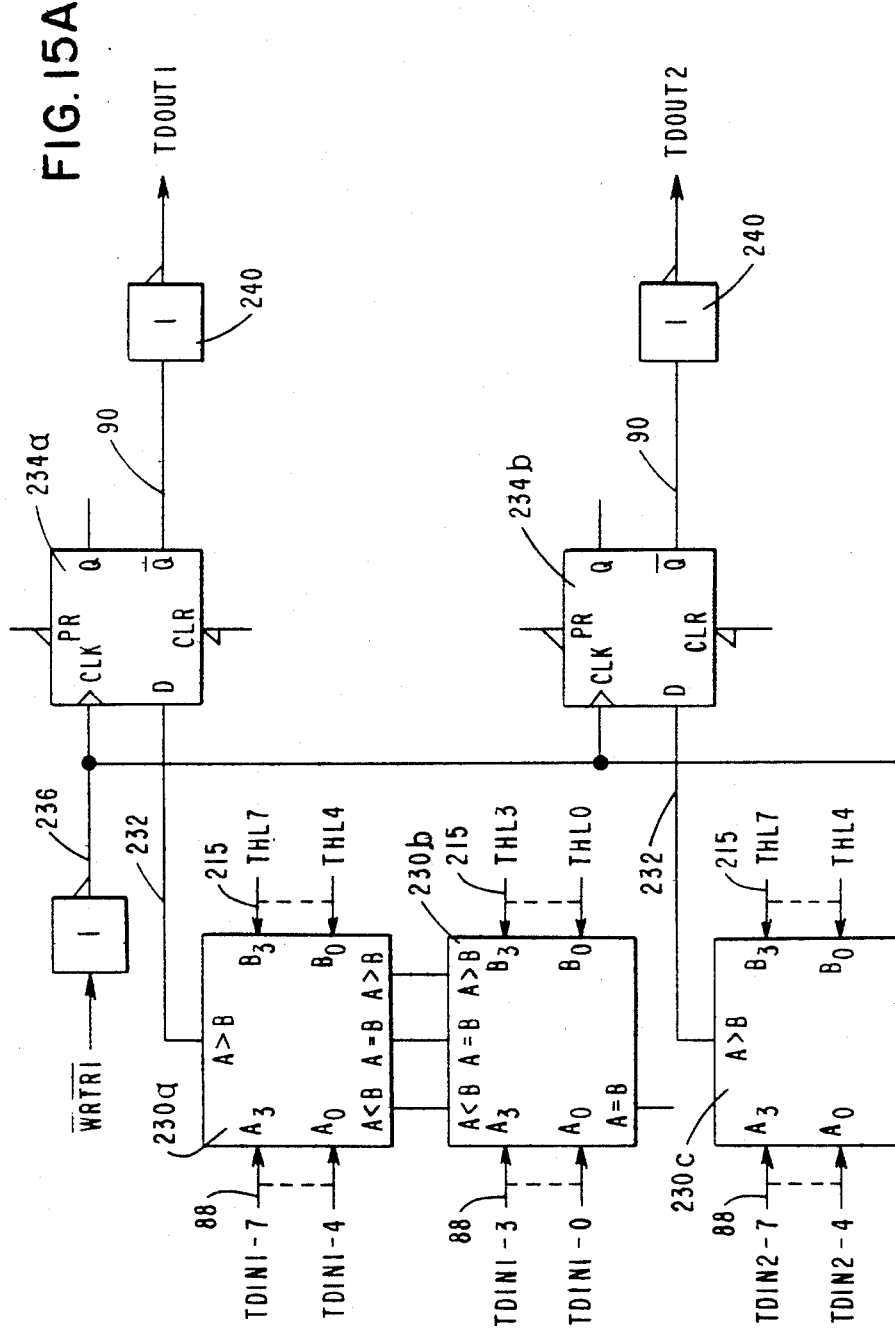

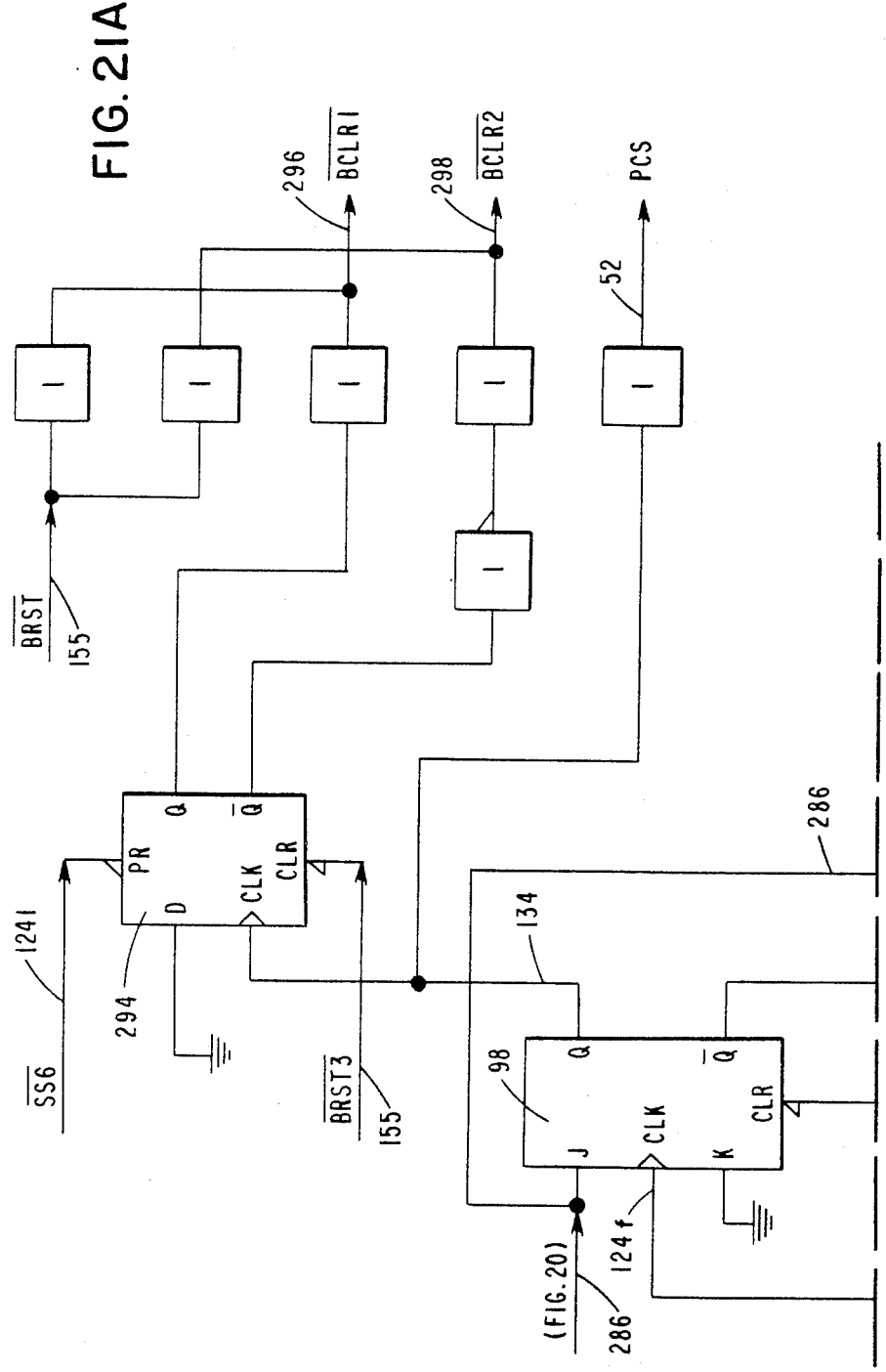

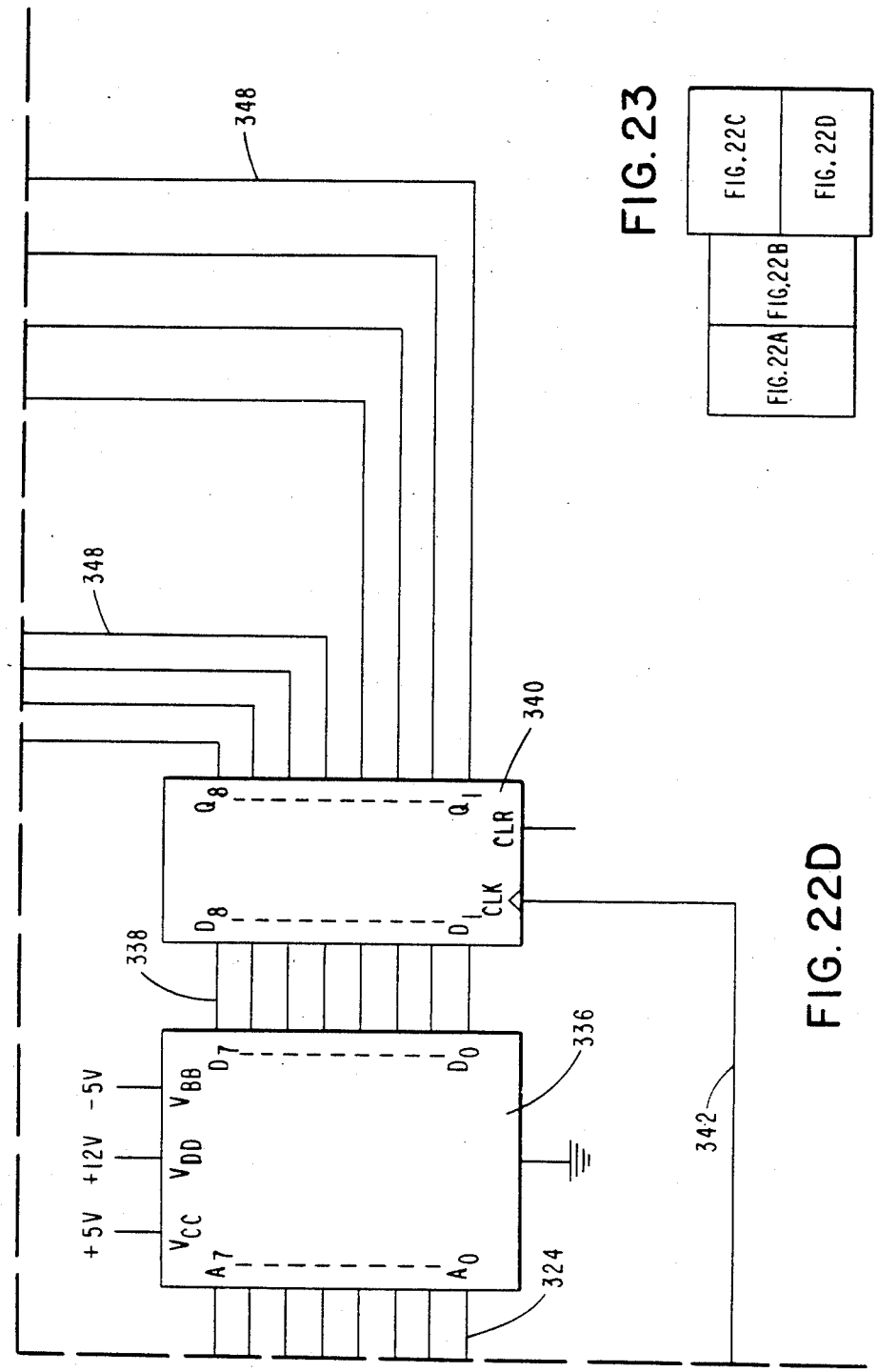

MATRIX CHARACTER READING SYSTEM

CROSS-REFERENCE TO RELATED APPLICATIONS

Reference is hereby made to the following copending patent applications, filed on even date herewith and assigned to the NCR Corporation: Matrix Character Preprocessing Systems, Ser. No. 331,936, by Nally et al. and Matrix Character Recognition System, Ser. No. 331,935, by Nally et al.

BACKGROUND OF THE INVENTION

The present invention relates to the field of machine recognition of magnetically printed characters on a document, and more particularly to a document reader system in which a multiple-gap magnetic read head is used in reading magnetized characters embodied in the form of E-13B character font printed on a document.

In single-gap magnetic character reading systems, a single analog input waveform is obtained by passing the characters to be sensed, normally printed on a document, beneath a magnetic read head at least as wide as the height of the characters and having a single flux gap. The signal generated by the read head is a derivative waveform representing the rate of change of magnetic flux transversing the head as the characters are scanned. Since the distrubution of ink, and thus flux, associated with each different character is unique, the waveform derived for each different character uniquely identifies that character.

In order to increase the amount of information that can be obtained when scanning the magnetically imprinted characters, multiple-gap magnetic read heads have been proposed in which multiple waveforms are produced. Whereas the single-gap read head produces an analog waveform as a result of the D.C. magnetization of the channels to be read, the multiple-gap read head produces a magnetic image of the character as a result of the A.C. magnetization of the character. Problems found in using a single-gap read head lie in determining from the information generated the start of the character wherein ink particles are encountered adjacent the character due to poor printing conditions. Also, the pigments of the magnetic ink used in the printing operation may not have been uniformly dispersed throughout the character, which produces information not capable of being used in the recognition process. It is therefore an object of this invention to provide an improved character recognition system. It is another object of this invention to provide a character recognition system which minimizes the effect of ink splatter in determining the start of the characters to be read. It is another object of this invention to utilize the maximum amount of information found in the waveforms generated by the character that is read.

SUMMARY OF THE INVENTION

These and other objects of this invention are fulfilled by providing a character recognition system in which a multi-channel read head generates a plurality of analog waveforms which form an image of the character read. The analog signals are first digitized and rectified after which static and dynamic threshold values are applied to provide a multi-column binary bit map of the character in which a logical "one" represents a spot of ink and a logical "zero" a blank space. Each column is then examined for the start of the character and the end of the character. The leading edge of a character is considered to occur if in two separate channels or rows of data across the columns, there is not found two consecutive zeros in the first seven bits of data in each channel or that the first and seventh bits are not both zeros. After the character start has been determined, the end of the character is detected by searching for an adjacent clear band whose width is based on the width of the character detected. This information is used in locating the character in the data generated during a recognition process operation.

BRIEF DESCRIPTION OF THE DRAWINGS

The foregoing and various other objects, acknowledged advantages and meritorious features of the present invention will be apparent from the following detailed description and appended claims, when read in conjunction with the drawings, wherein like numerals identify corresponding elements.

FIG. 5B, is a diagram showing the manner in which FIGS. 5A–5D inclusive are arranged to form the block diagram;

FIGS. 7A and 7B taken together disclose the logic circuits for generating the sequencing signals used in the present invention;

FIGS. 11A and 11B, taken together, disclose the logic circuits found in the multiplexing unit of FIG. 5B;

FIG. 12 is a diagram of a portion of the logic circuits found in the threshold logic unit of FIG. 5C;

FIGS. 13A–13D inclusive are diagrams of the logic circuits found in the peak value detector of FIG. 5C;

FIG. 14 is a diagram showing the manner in which FIGS. 13A–13D inclusive are arranged to form the block diagram;

FIGS. 15A–15C inclusive are diagrams of the logic circuits found in the threshold logic unit of FIG. 5C showing the comparators used in comparing the threshold value with the value of the data read by the multi-channel read head;

FIG. 16 is a diagram showing the manner in which FIGS. 15A–15C inclusive are arranged to form the block diagram;

FIG. 17A, is a diagram showing the manner in which FIGS. 17A–17D inclusive are arranged to form the block diagram;

FIGS. 21A and 21B, taken together, disclose the pre-character start flip-flop unit and the character start flip-flop unit of FIG. 5D;

FIGS. 22A–22D inclusive, taken together, form a diagram of the logic circuits used in the character end detection logic unit of FIG. 5D;

FIG. 23 is a diagram showing the manner in which FIGS. 22A–22D inclusive are arranged to form the block diagram;

DESCRIPTION OF THE PREFERRED EMBODIMENT

Figure 1:
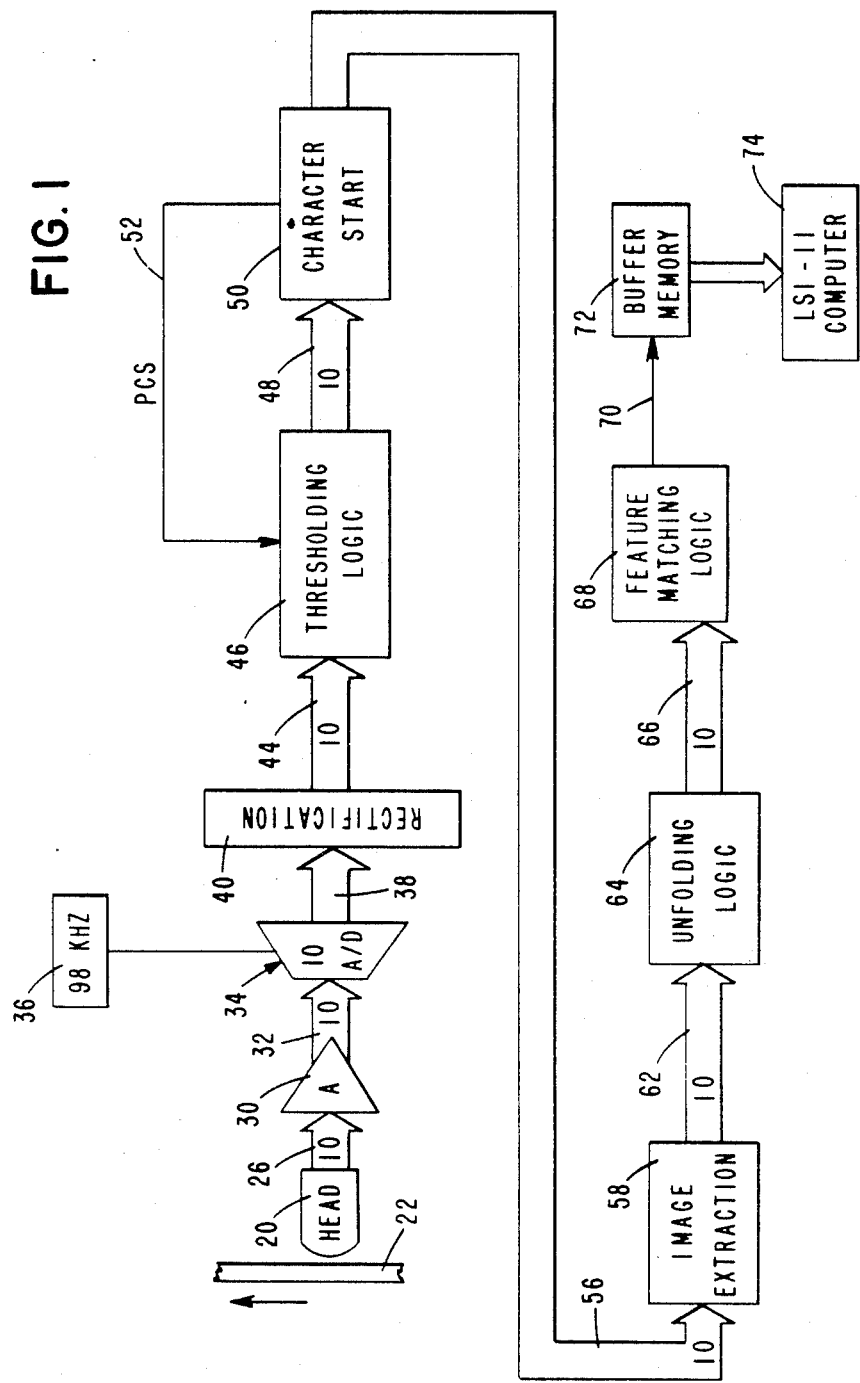
FIG. 1 shows a block diagram of the character reading system making up the present invention.
Figure 2:
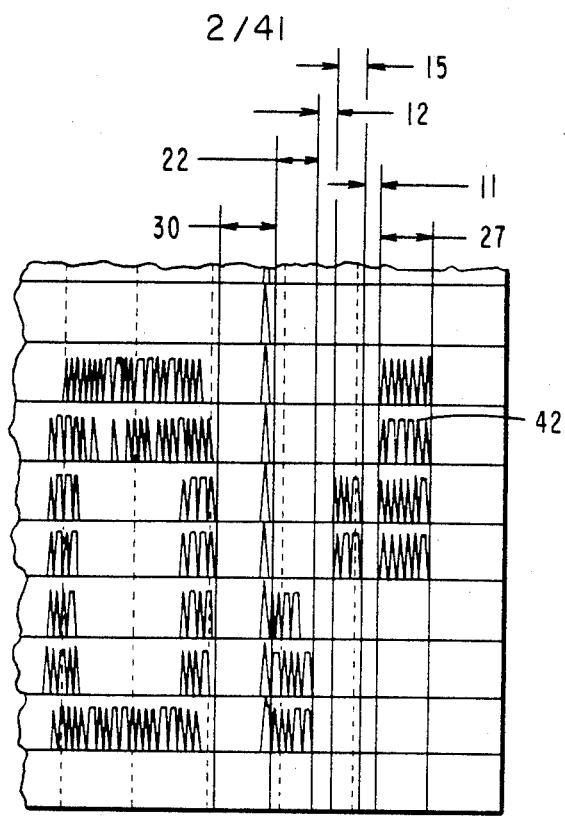
FIG. 2 is a schematic diagram of the analog signals of FIG. 3 which have been thresholded.
Figure 3:
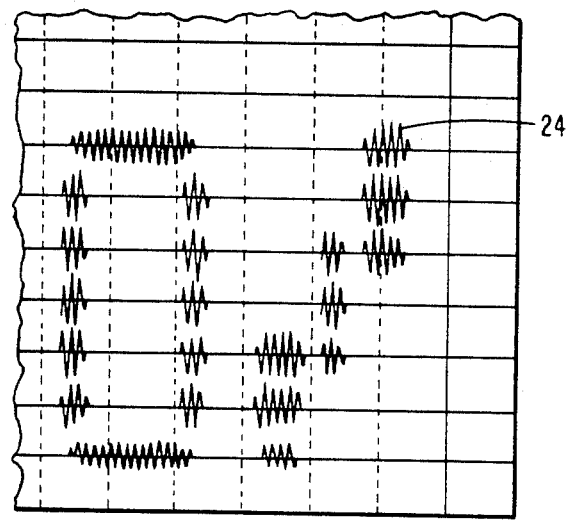
FIG. 3 is a schematic diagram of the analog signals generated by the multi-channel read head forming an image of the characters read.

Referring now to FIG. 1, there is shown a block diagram of the character recognition system which includes a multi-channel magnetic read head 20 positioned adjacent the path of movement of a document 22 having characters printed thereon in magnetic ink. While the preferred characters in the present embodiment are printed in the form of the E-13B character font which is well-known in the art and which has been adopted by the American Bankers Association for use with banking checks in this country, it is obvious that the recognition system of the present invention can be used with any character font which produces an image of the character read when scanned by the read head 20. The read head 20 consists of thirty magnetic pick-up channels in which every tenth channel is multiplexed to output ten channels of discrete analog signals 24 (FIG. 3) over bus 26 upon movement of the document 22 past the read head 20. As shown in FIG. 3, an image of the character read is formed by the analog signals 24 in which the character is seven channels high. Each analog signal 24 corresponds to the time derivative of the change of flux of the magnetized ink. Each of the analog signals 24 outputted by the read head 20 is amplified by an amplifier 30 and transmitted over bus 32 to a plurality of A/D converters 34 which samples the analog signals at a 98 KHz. rate by clock signals received from the clock generator 36. The digitized signals are transmitted over bus 38 to a rectifier unit 40 which outputs both positive and negative rectified signals over bus 44 to a thresholding logic unit 46 which applies a static threshold value to the digitized signals. The fixed threshold value is selected to have a signal level slightly above the background noise to separate the magnetic ink information from the background noise. The resulting rows of thresholded data signals 42 (FIG. 2) are then transmitted over bus 48 to character start logic unit 50 which examines the data to locate the start of the character read. The character start logic unit 50, upon finding a character start, will generate a pre-character signal PCS over line 52 putting the thresholding logic unit 46 in a mode to examine the same data received over bus 44 using a dynamic threshold value based on the peak value of the analog signals received from the rectifier 40. The thresholded data signals 42 (FIG. 2) are again transmitted to the character start logic unit 50 which determines the final start of the character read from the data received, together with the end of the character. These signals which are represented by binary bits are transmitted over bus 56 to an image extraction logic unit 58 for use in processing the data.

The binary data representing the thresholded data signals 42 (FIG. 2) transmitted over bus 56 are processed by the image extraction logic unit 58 which examines every seven bits of the received data 42. If it finds a zero bit surrounded by one bits, the logic unit will fill in a one bit at that location and then determine if each of the seven bits comprises an ink spot represented by a one bit or a blank spot represented by a zero bit. The resulting reduced 14×10 bit map of the scanned character is transmitted over bus 62 to an unfolding logic unit 64 which examines the 14×10 bit map to locate and identify the location of the top portion of the scanned character within the bit map. Details of the construction of the image extraction logic unit 58 and the unfolding logic unit 64 are disclosed in the previously-referenced Nally et al. copending application, Ser. No. 331,936.

The processed 14×10 bit map outputted by the unfolding logic unit 64 is transmitted over bus 66 to a feature matching logic unit 68 which matches known character templates to the bit map appearing on bus 66. The logic unit 68 will generate data and control signals over line 70 for storage in a buffer memory unit 72 identifying the template having the closest match to the received character bit map. The data is then transmitted to a central processing unit 74 for processing of the data. Details of the construction of the feature matching logic unit 68 are disclosed in the previously-referenced Nally et al. co-pending application, Ser. No. 331,935.

Figure 5A:
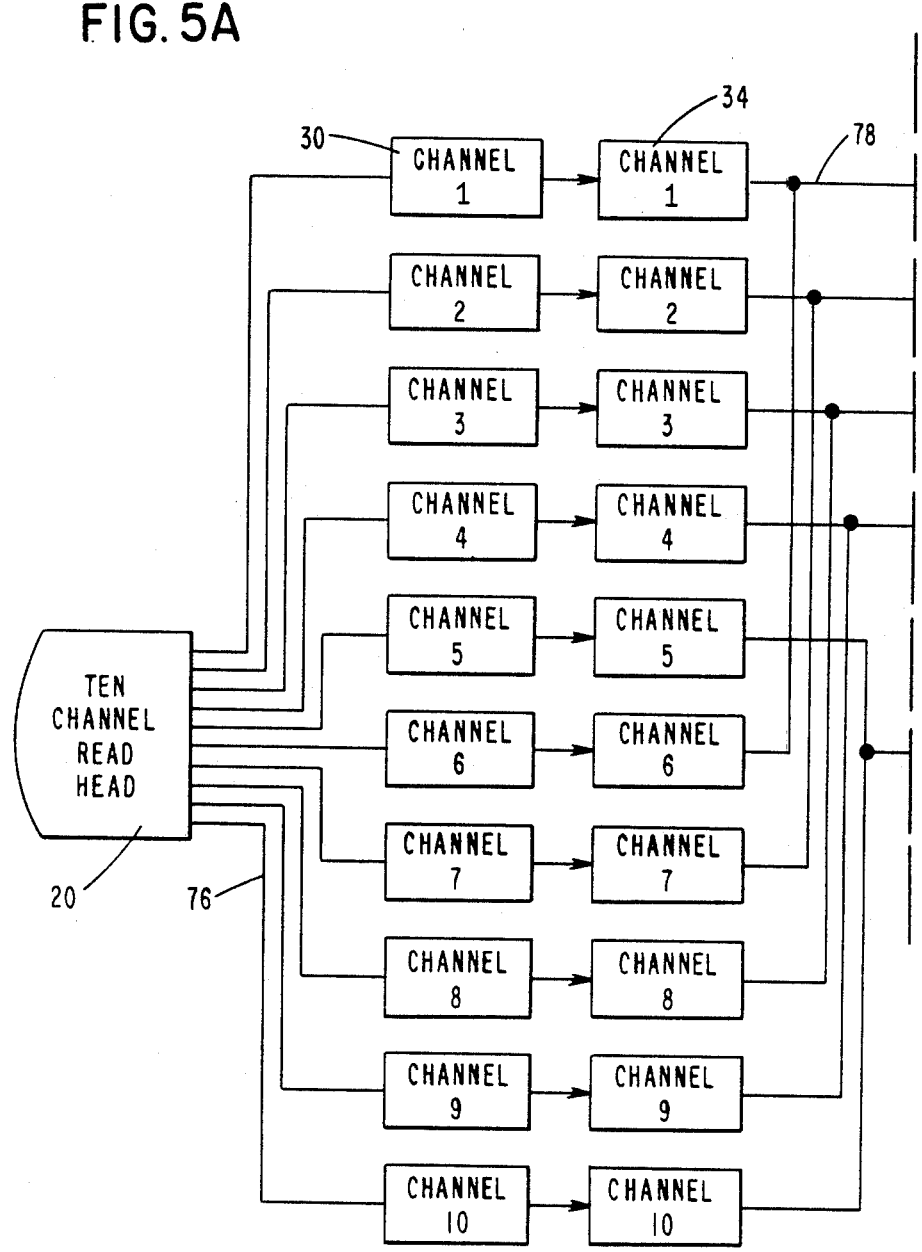
FIGS. 5A–5D inclusive, taken together, disclose a block diagram of the circuits for detecting the start and the end of a character.

Referring now to FIGS. 5A–5D inclusive, there is disclosed a block diagram of the logic circuits for determining the start and the end of the character read by the read head 20 (FIG. 1). As shown in FIG. 5A, the read head 20 will output one of ten analog signals 24 (FIG. 3) over each of the lines 76 to a pre-amplifier and band pass filter 30 which amplifies the signal and transmits the signals to an A/D converter 34. The A/D converter 34 will sample the analog signals at a 98 KHz. rate and output the digitized analog signals over line 78 to a rectification logic unit 40 (FIG. 5B) for rectifying the signals which includes converting the negative signal levels to a positive signal level. The rectification logic unit 40 is operated to process five channels at a time. Thus, the upper five channels are processed first followed by the lower five channels. The binary bits of each channel outputted by the rectification logic units 40 are transmitted over lines 80 to a buffer unit 82, a seven bit delay and buffer unit 84 and a multiplexing unit 86. The buffer unit 82 will output the five channels of data bits over lines 88 to the threshold logic unit 60 (FIG. 5C) which applies a fixed or static threshold to the incoming data bit to eliminate as much background noise as possible and then outputs the thresholded data bits over lines 90 to a plurality of serial-in-parallel-out register units 92.

Figure 5B:
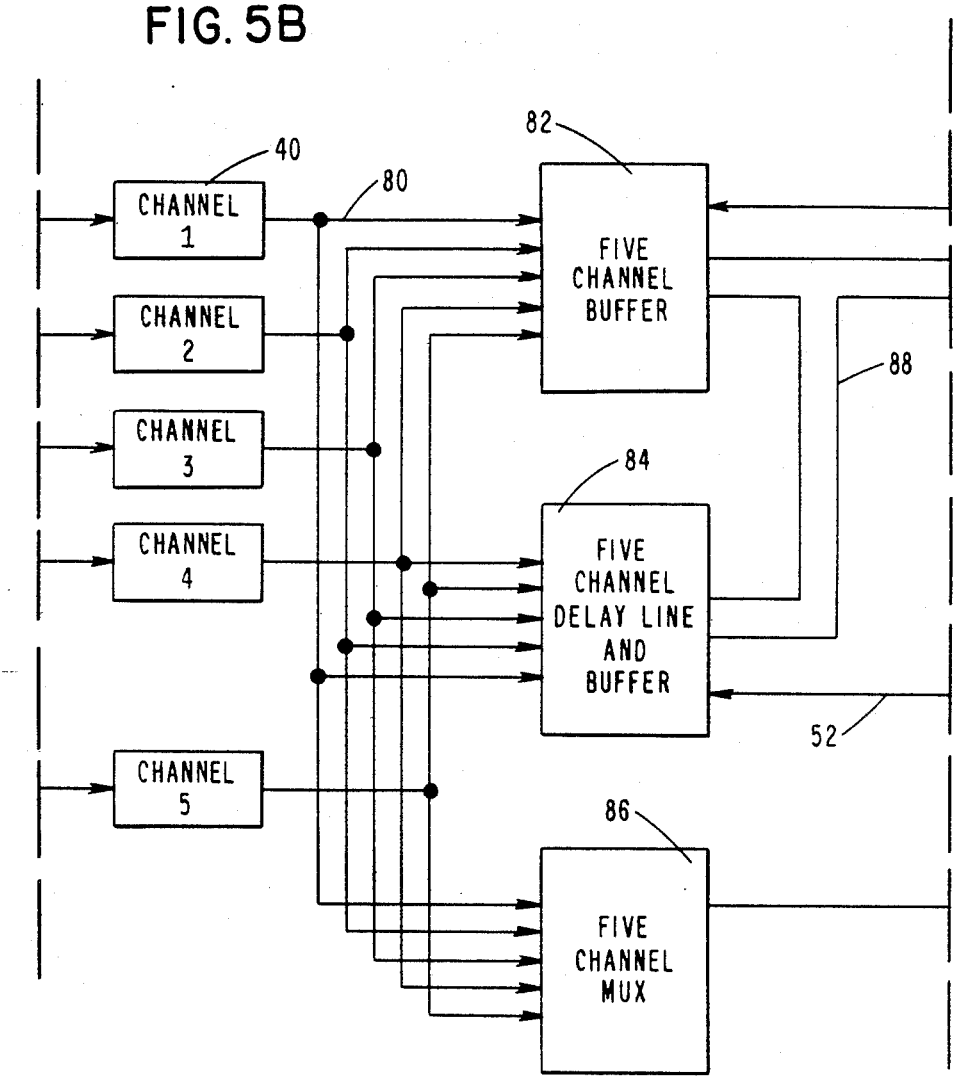
Figure 6:
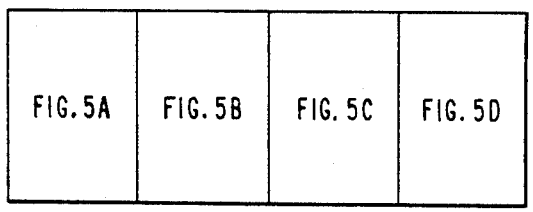
FIG. 6, on the sheet containing
Figure 5C:
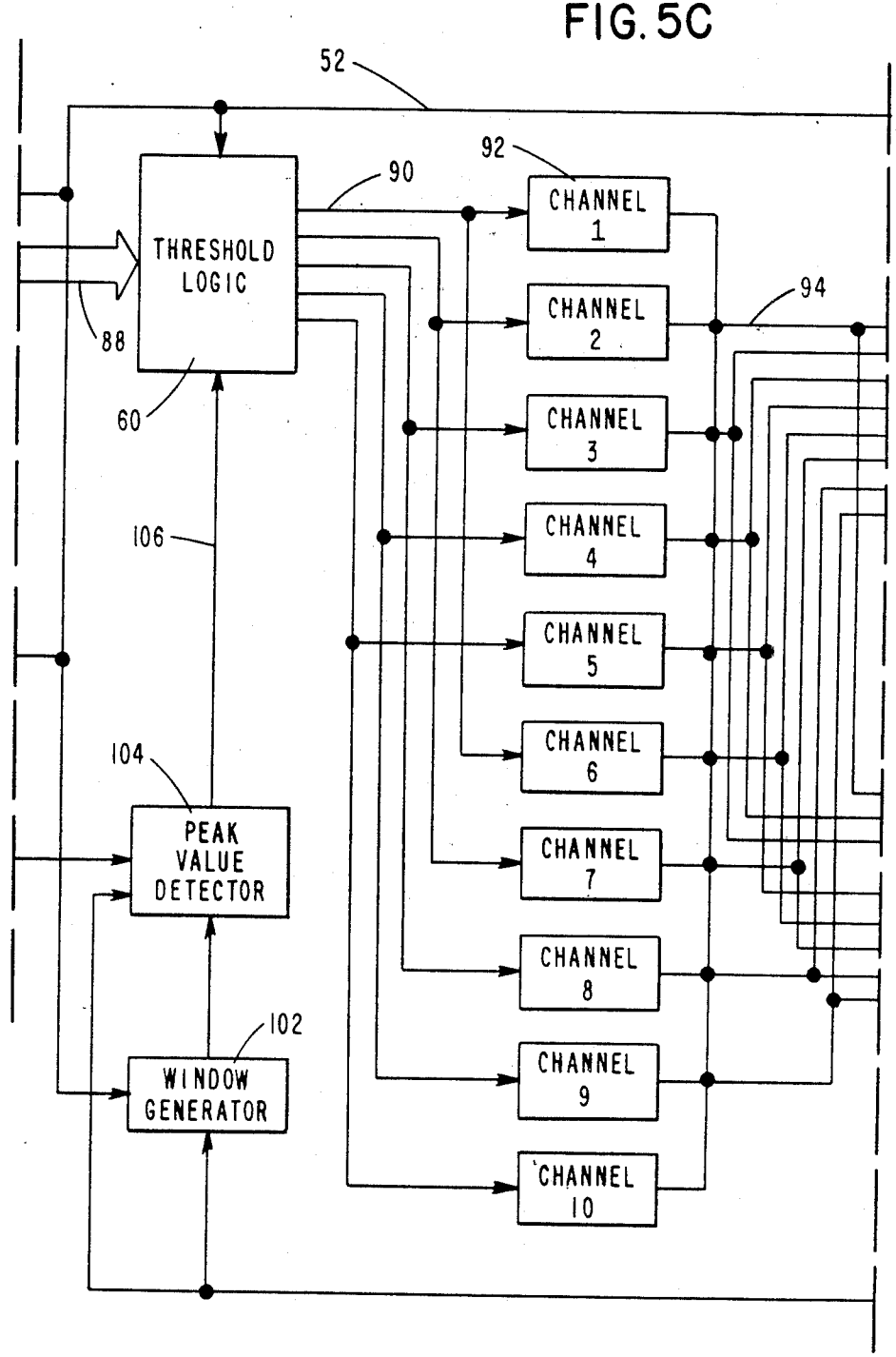
Figure 5D:
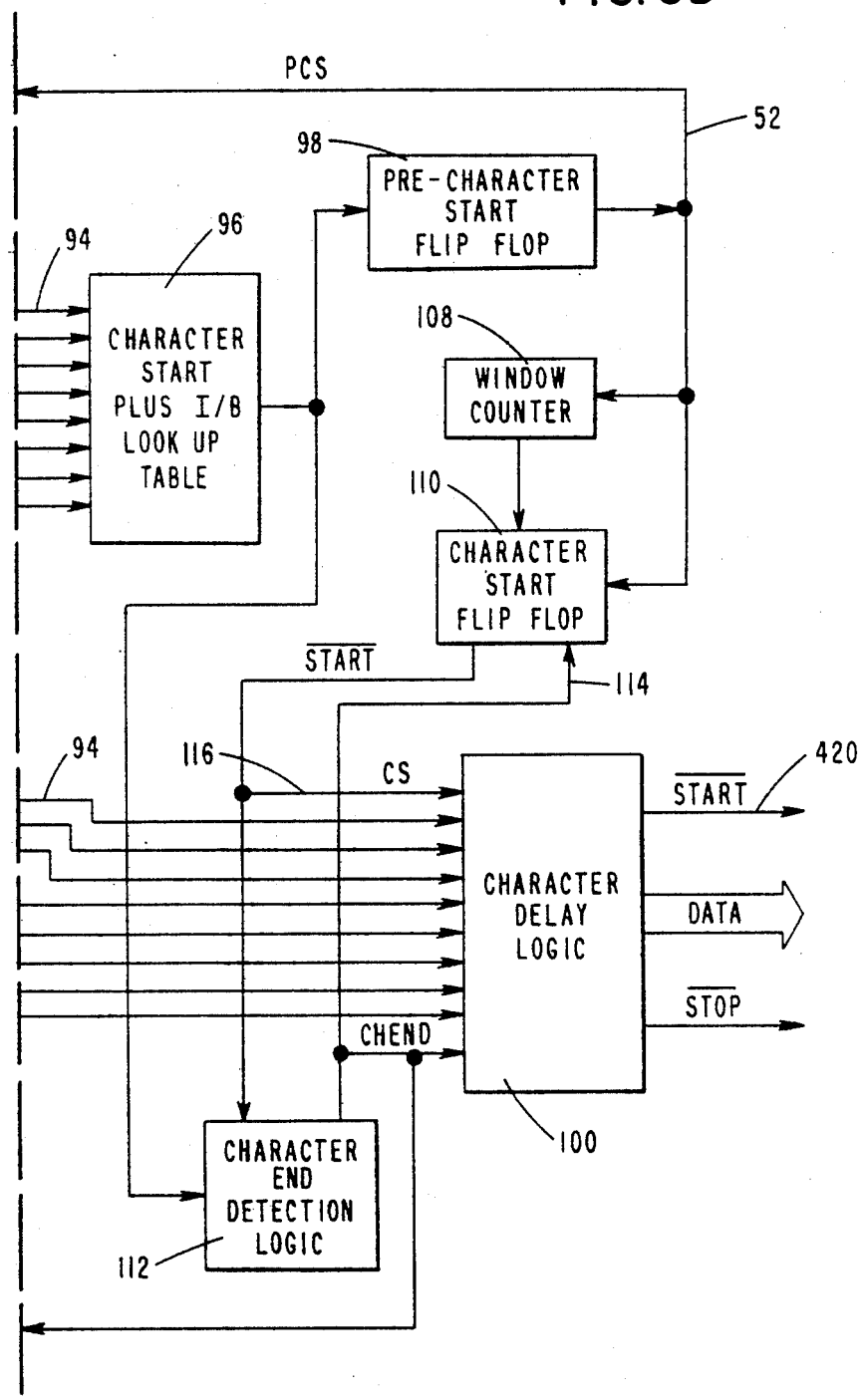
Figure 8:
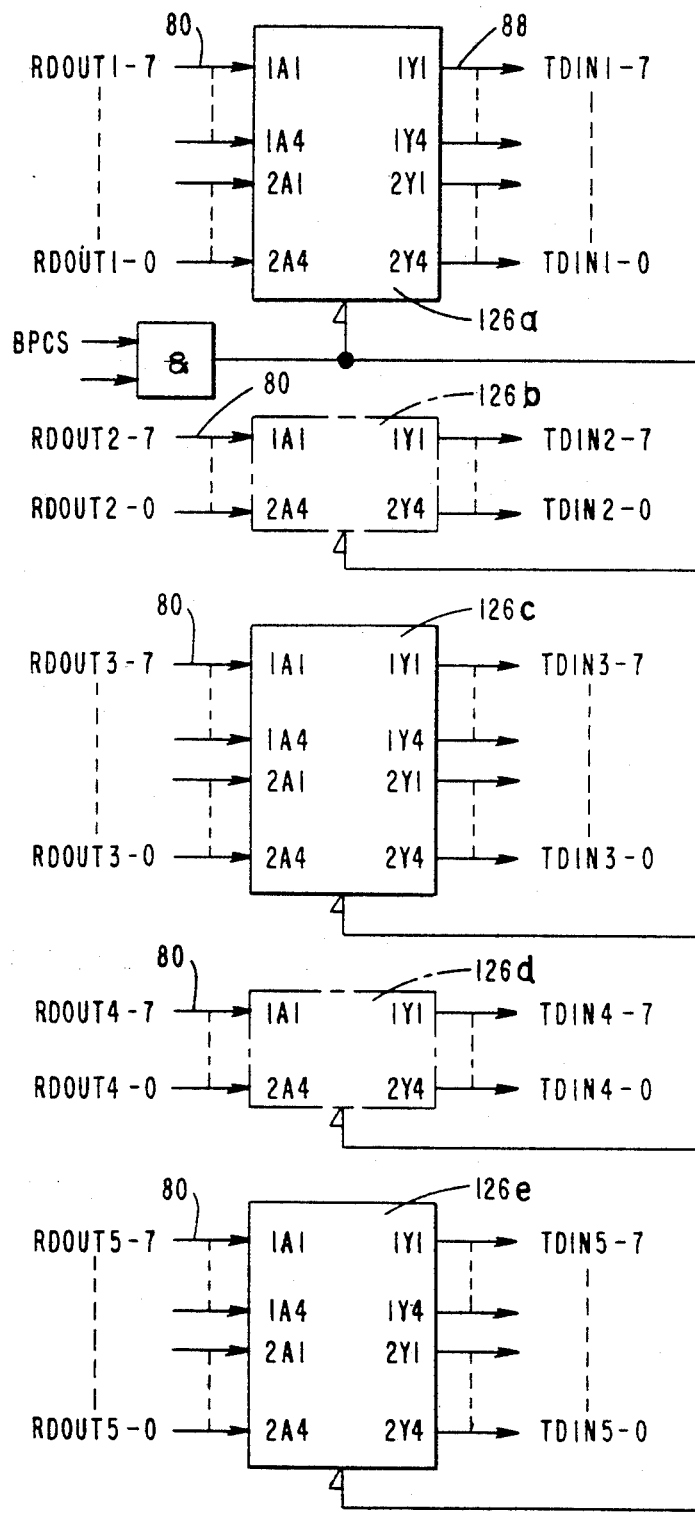
FIG. 8 is a diagram of the logic circuits including the tri-state buffers found in the buffer unit of FIG. 5B.

The register units 92 will output in parallel form the data bits of each channel over lines 94 to a character start lookup table unit 96 which examines the first seven bits of data appearing in a number of adjacent channels to determine whether the incoming data constitutes the start of a character. Upon finding a character start, the lookup table unit 96 will set a pre-character start flip-flop 98 which outputs a precharacter start signal PCS over line 52 enabling a window generator unit 102 (FIG. 5C) to operate a peak value detector unit 104 which detects the maximum peak value in each window of data bits outputted by the multiplexing unit 86 (FIG. 5B). The peak value that is detected representing the maximum ink intensity of the character in that window is transmitted over line 106 to the threshold logic unit 60 which generates a dynamic threshold value based on the peak value. The new dynamic threshold value is then applied to the data bits outputted by the delay unit 84 (FIG. 5B) which delays the incoming data bits appearing on line 80 by seven bits. The data bits thus processed with the new threshold value are then transmitted through the serial-in-parallel-out register units 92 to the table lookup unit 96 which again determines the character start based on the data bits received. The pre-character signal PCS also enables a window counter 108 to count each window in the channel containing seven bits of data after the pre-character start signal has become active (FIG. 5D). If a character start is not detected in the first window of data bits, the counter 108 will set a character start flip-flop 110 after the appearance of the second window of data, the flip-flop outputting a character start signal $\overline{START}$ appearing on line 116 which enables the character end detection logic unit 112. Upon establishing the end of character, a character end signal CHEND is transmitted over line 114, which together with the character start signal appearing on line 116 are transmitted to a character delay logic unit 100 which receives the data bits over lines 94 from the registers 92 (FIG. 5C). After a delay of 128 bit times, the logic unit 100 will output the data together with the character start signal $\overline{START}$ and the character end signal $\overline{STOP}$ to the feature or image extraction logic unit 58 (FIG. 1) for use by the unit in reducing the data bits to a 14×10 bit map in the manner described previously.

Referring now to FIGS. 7A and 7B, there is shown a 7442 decoder logic unit 120 which receives the output count of a counter (not shown) over lines 122 through drivers 123. The decoding unit 120 will output sequencing signals SS0-SS8 inclusive over lines 124a-124l inclusive (FIG. 7A) for controlling the logic units used in processing the generated data bits. Also included in the logic circuit is a 74LS74 flip-flop 121 (FIG. 7B) clocked by the buffer write multiplex signal $\overline{BWTR1}$ appearing on line 123. The signal is used to multiplex the first five channels and then the second five channels of data. Clocking of the flip-flop 121 outputs the channel select signals CISEL1 over line 125a and CISEL2 over line 125b.

Figure 9A:
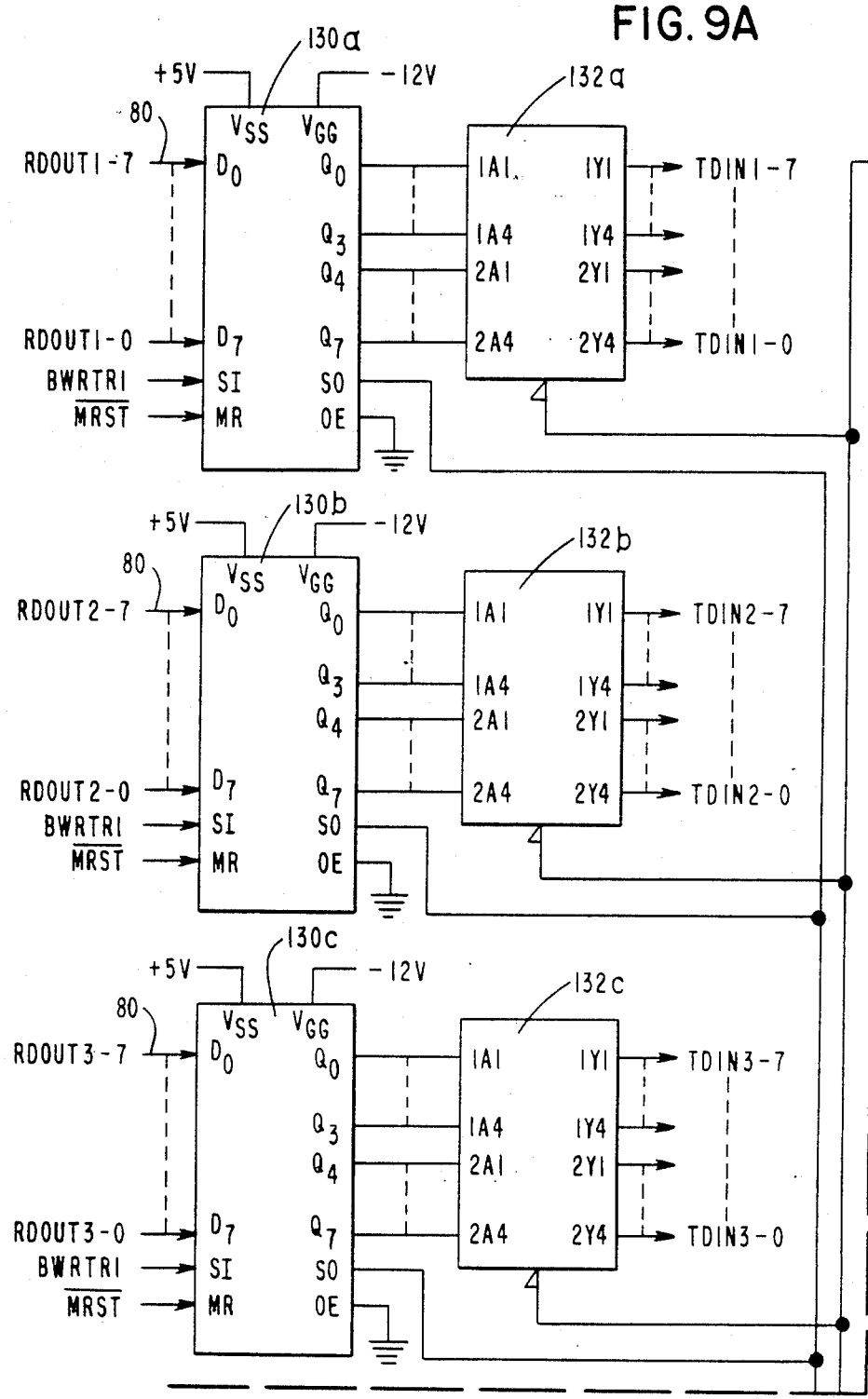
FIGS. 9A–9C inclusive are diagrams of the logic circuits found in the delay and buffer unit of FIG. 5B.
Figure 9B:
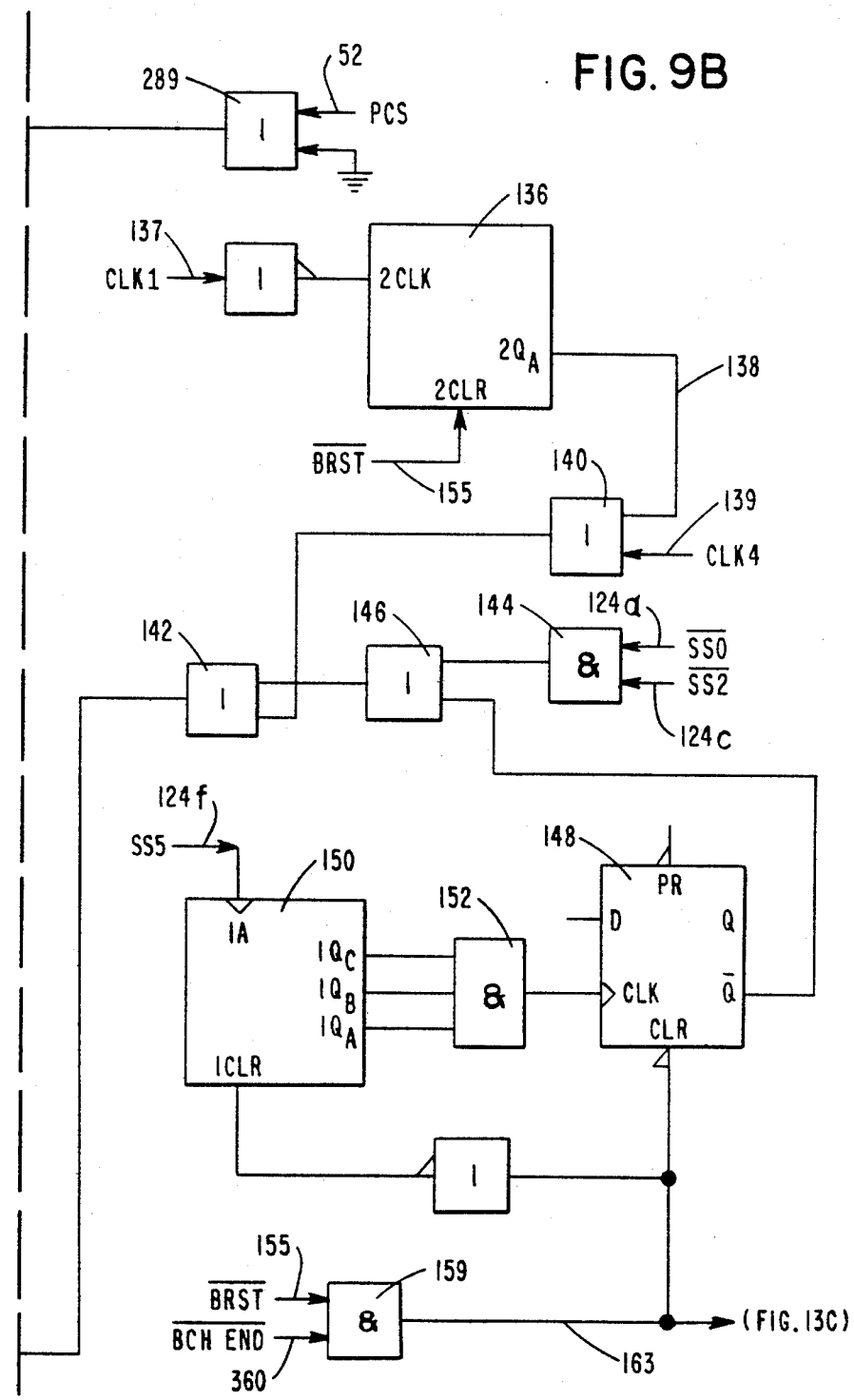
Figure 9C:
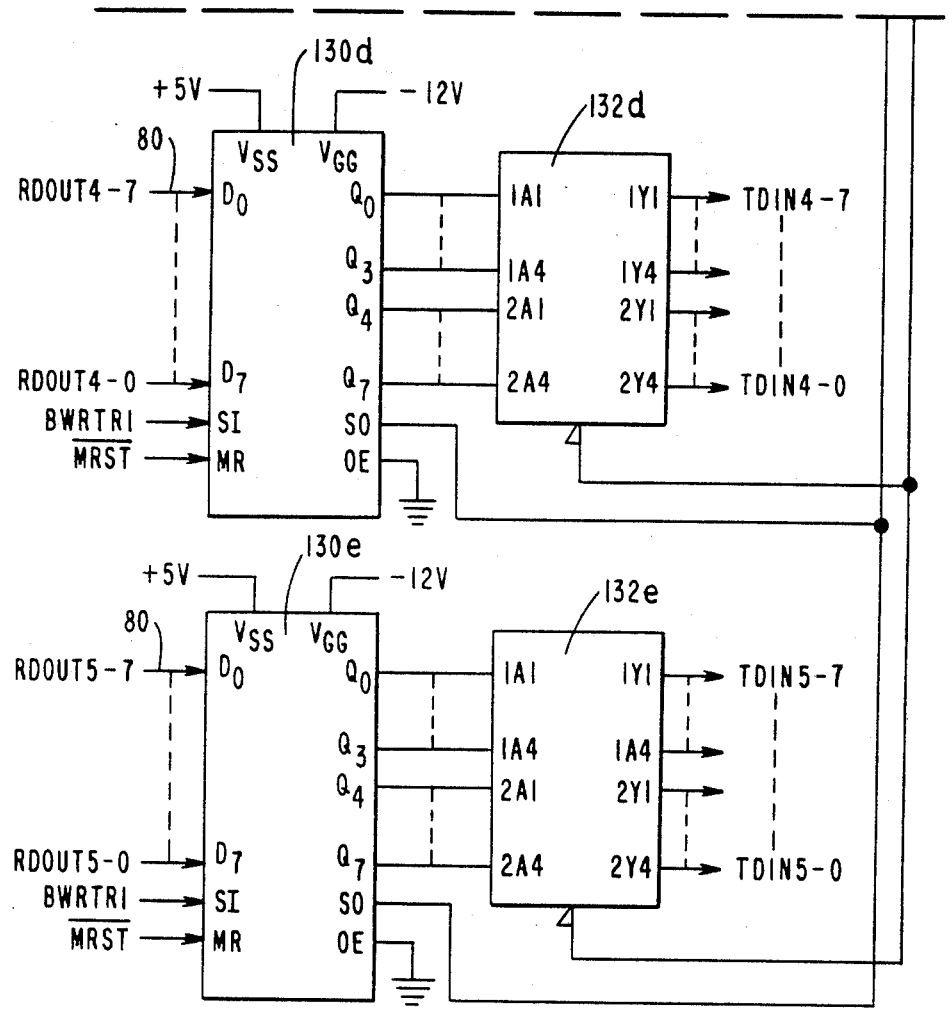
Figure 10:
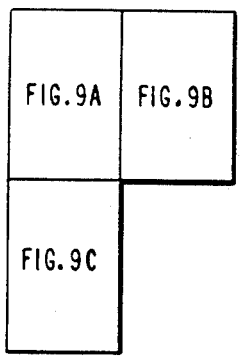
FIG. 10 is a diagram showing the manner in which FIGS. 9A–9C inclusive are arranged to form the block diagram.
Figure 27:
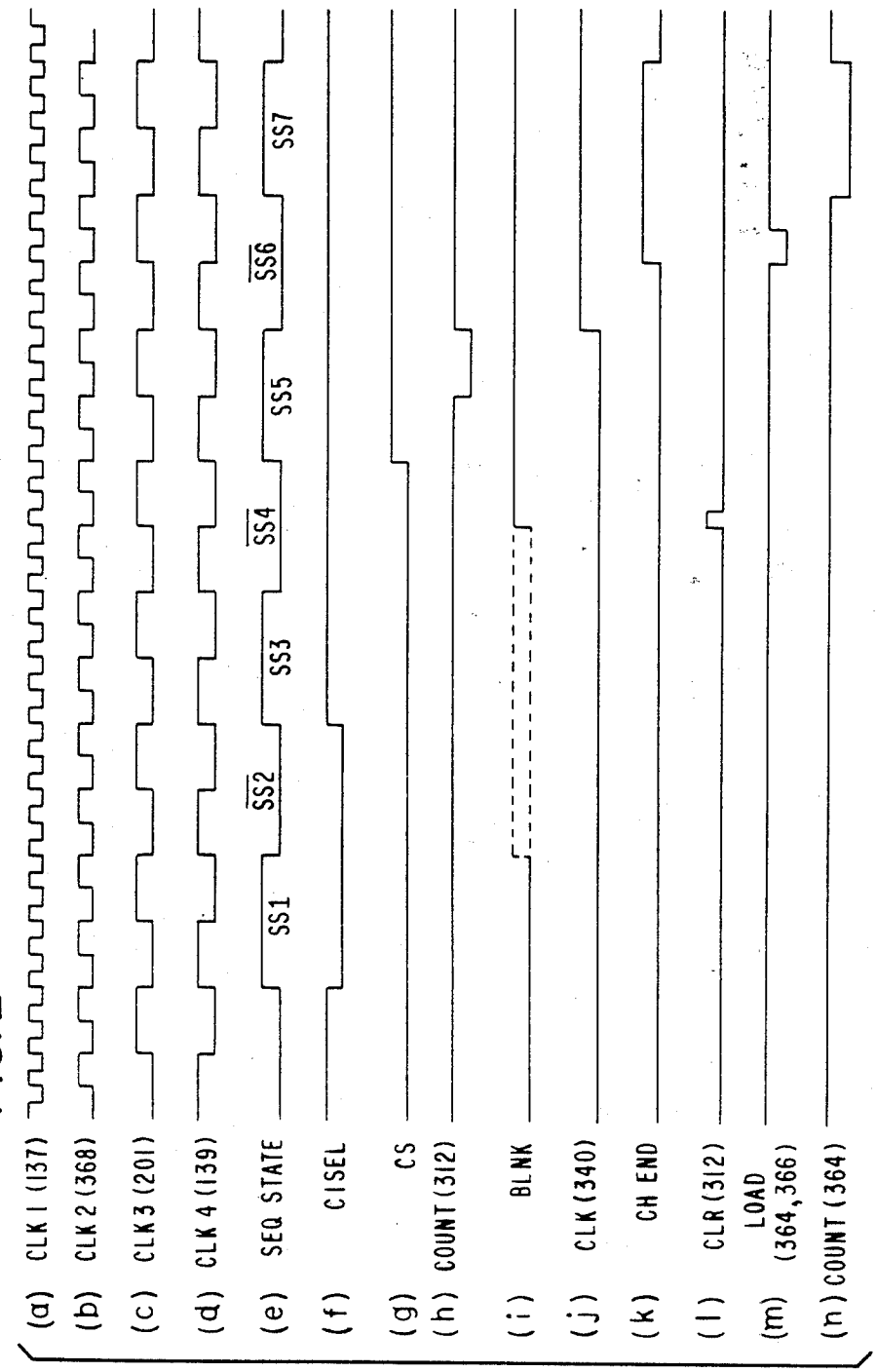
FIG. 27 is a diagram showing various waveforms used in the character recognition system of the present invention.

Referring now to FIGS. 8 and 9A–9C inclusive, there is shown the buffer unit 82 (FIG. 5B) and the delay line unit 84. The buffer unit comprises five 74LS244 buffer logic circuits 126a–126e inclusive (FIG. 8) which buffers five channels of rectified data bits outputted by the rectifying logic units 40 (FIG. 5B) over lines 80. The data bits are outputted by the buffer unit 82 over lines 88 to the threshold logic unit 60 (FIG. 5C) where a fixed threshold value is initially applied to the data. The rectified data bits are also inputted over lines 80 to five 3351 FIFO registers 130a–130e inclusive (FIGS. 9A and 9C) which will delay the outputting of the rectified data bits by seven bit times, which time period comprises one window length. The delayed data bits are outputted to the buffers 132a–132e inclusive (FIGS. 9A and 9C) when enabled by the pre-character start signal PCS appearing on line 52 in a manner to be described more fully hereinafter. The FIFO registers 130a–130e inclusive are sequentially enabled by the sequence signals $\overline{SS0}$ and $\overline{SS2}$ appearing on lines 124a and 124c respectively together with the clock signals CLK1 (FIG. 27a) appearing on line 137 and CLK4 (FIG. 27d) appearing on line 139, the latter signal clocking a 74LS393 counter 136 (FIG. 9B) whose output signals appearing on line 138 are transmitted through the OR gates 140 and 142 enabling the delay registers 130a–130e inclusive (FIGS. 9A and 9C). The OR gate 142 also receives a signal from AND gate 144 derived from the sequencing signals $\overline{SS0}$ and $\overline{SS2}$.

Figure 25:
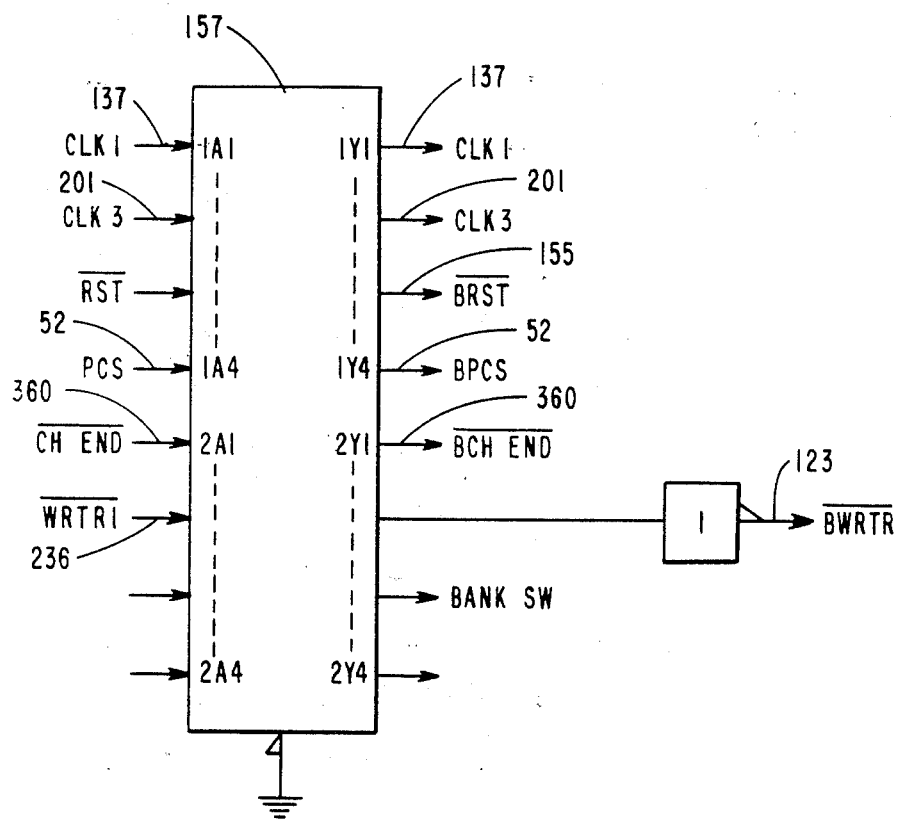
FIG. 25 is a diagram of a logic circuit for generating various control signals used in the operation of the character recognition system.

The output signal of AND gate 144 is transmitted through the OR gate 146 which also receives a signal from a 74LS74 flip-flop 148 which is clocked by the output count of a 74LS393 counter 150 enabled by the sequencing signals SS5 appearing on line 124f upon reaching a count of five. The output signals of the counter 150 are ANDed by the AND gate 152 which clocks the flip-flop 148 whose $\overline{Q}$ output signal is transmitted through the OR gates 146 and 142. These signals enable the output function of the registers 130a–130e inclusive. The outputted data bits of the buffers 132a–132e inclusive are transmitted over the lines 88 to the threshold logic unit 60 (FIG. 5c) where the dynamic threshold values are applied. The flip-flops 136 and 148 are reset by the system reset signal $\overline{BRST}$ appearing on line 155. The signals are outputted from a 74LS244 buffer logic unit 157 (FIG. 25) which outputs the buffer signals $\overline{CLK1}$, $\overline{CLK3}$ (FIGS. 27a and c), the character end signal $\overline{BCHEND}$, the system reset signal $\overline{BRST}$, the precharacter start signal BPCS, the buffer write signal $\overline{BWRTR}$ and the bank switch signal $\overline{BANKSW}$. These signals are used in controlling the operation of various logic circuits as will be described more fully hereinafter. The reset signal $\overline{BRST}$ appearing on line 155 is gated through the AND gate 159 by the character end signal $\overline{BCHEND}$ appearing on line 360 and is outputted over line 163 for resetting the flip-flop 148 in addition to other logic circuits of the system.

Figure 11A:
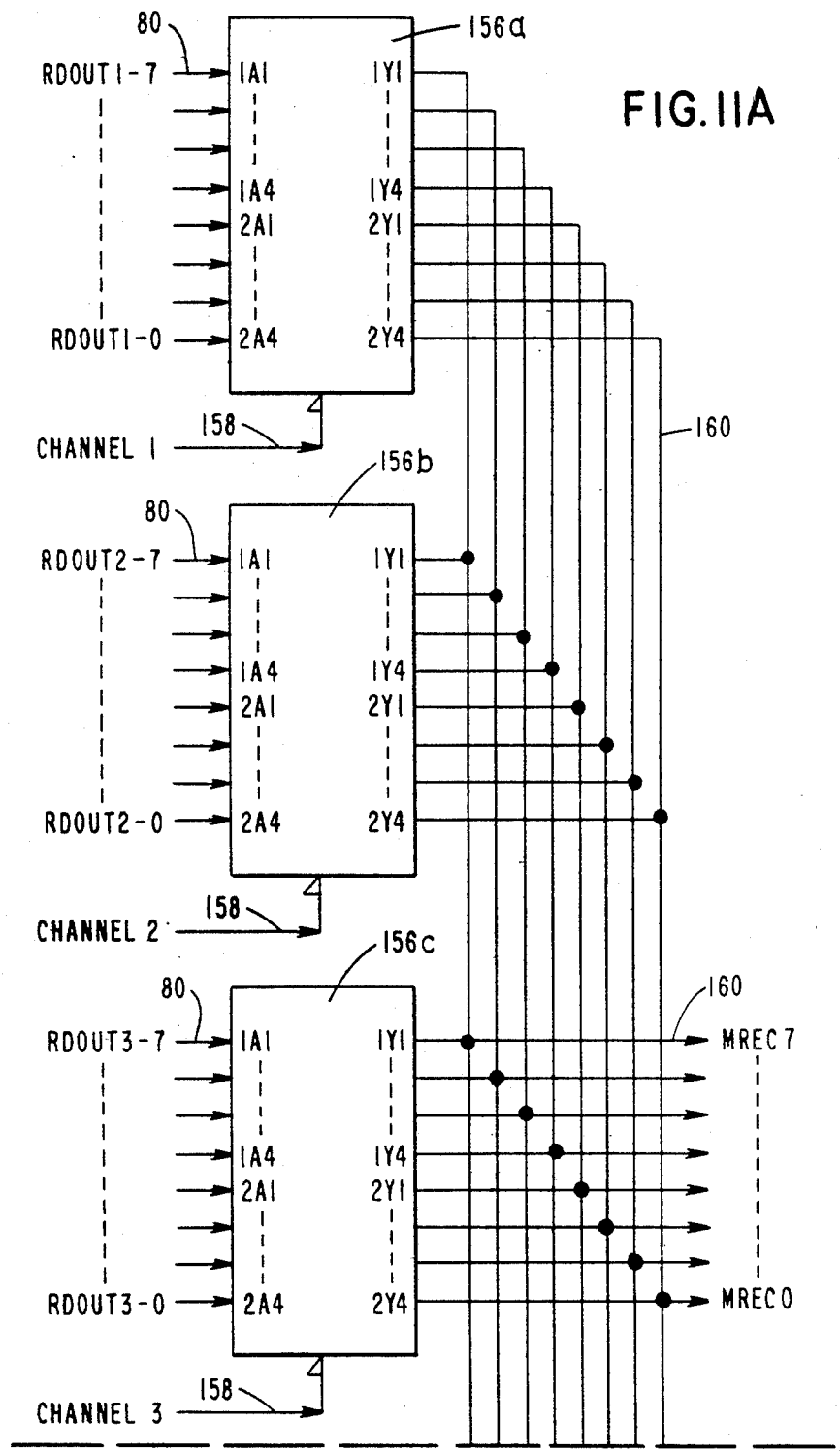

Referring now to FIGS. 11A and 11B, there is shown the logic circuits in the multiplexing unit 86 (FIG. 5B) comprising a plurality of 74LS244 buffers 156a–156e inclusive which receive the rectified data bits over lines 80. Each of the buffer units is sequentially enabled by the channel select signals CHANNEL 1-5 inclusive appearing on lines 158 for outputting over lines 160 the seven data bits comprising each window in each of the channels to the peak value detector unit 104 (FIG. 5C) to determine the peak value of each of the windows. The seven binary bits appearing on lines 160 are parallel loaded into a 74LS273 latch member 162 (FIG. 13A) and also into a pair of 74LS85 comparator members 164 and 166 (FIG. 13B) which compare the bits with the seven binary bits of data representing the maximum signal level previously inputted into the latch member 162 which was outputted to the comparator member 164 and 166 upon the loading of the current seven binary bits onto the members. If the value of the data bits appearing on line 160 is greater than the value of the data bits stored in latch 162, a high signal appearing on line 165 will enable an AND gate 167 to clock the new data into the latch 162. The output signals of the latch member 162 are also stored in a second 74LS273 latch member 170 (FIG. 13c).

Figure 13A:
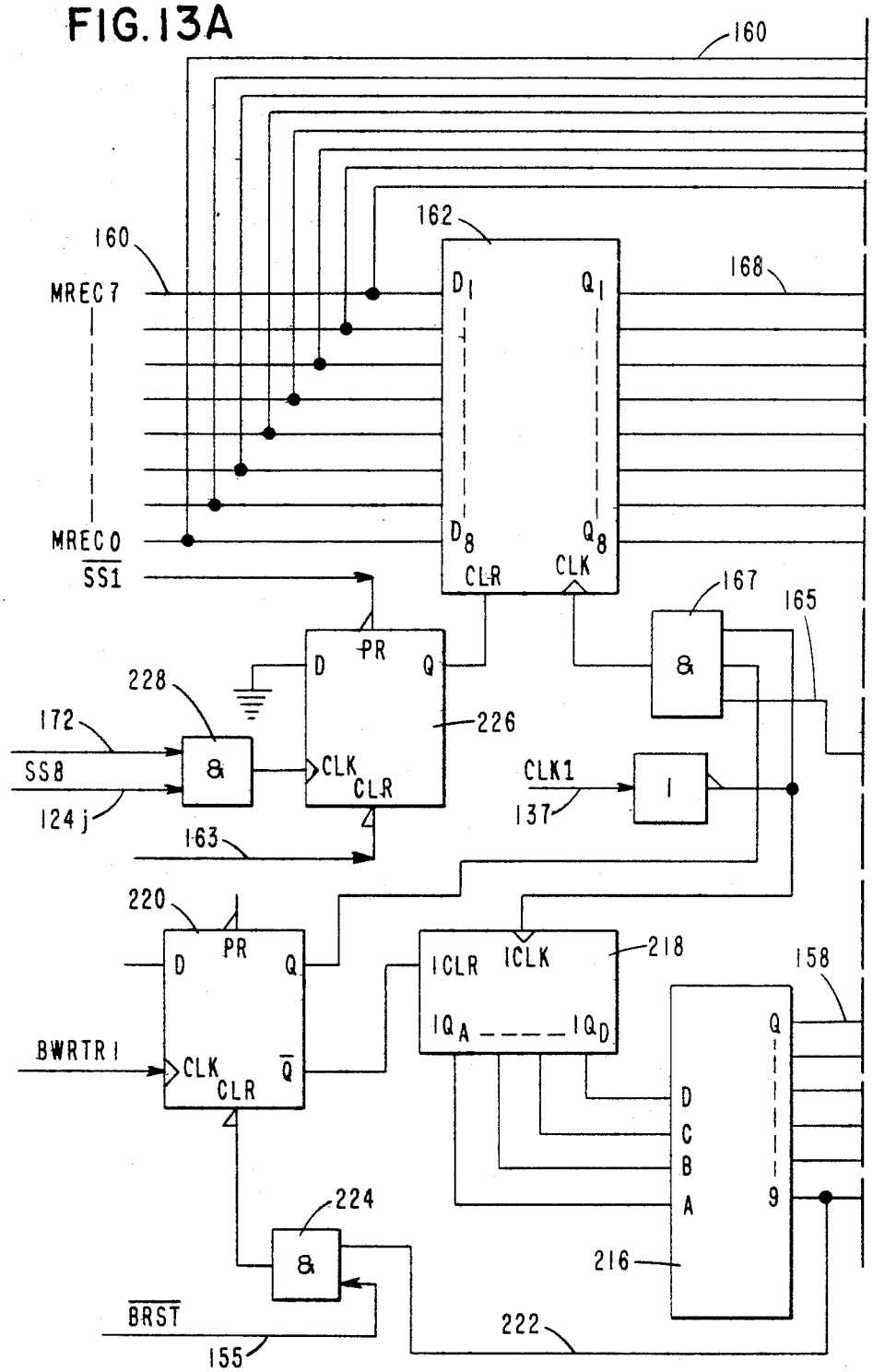
Figure 13B:
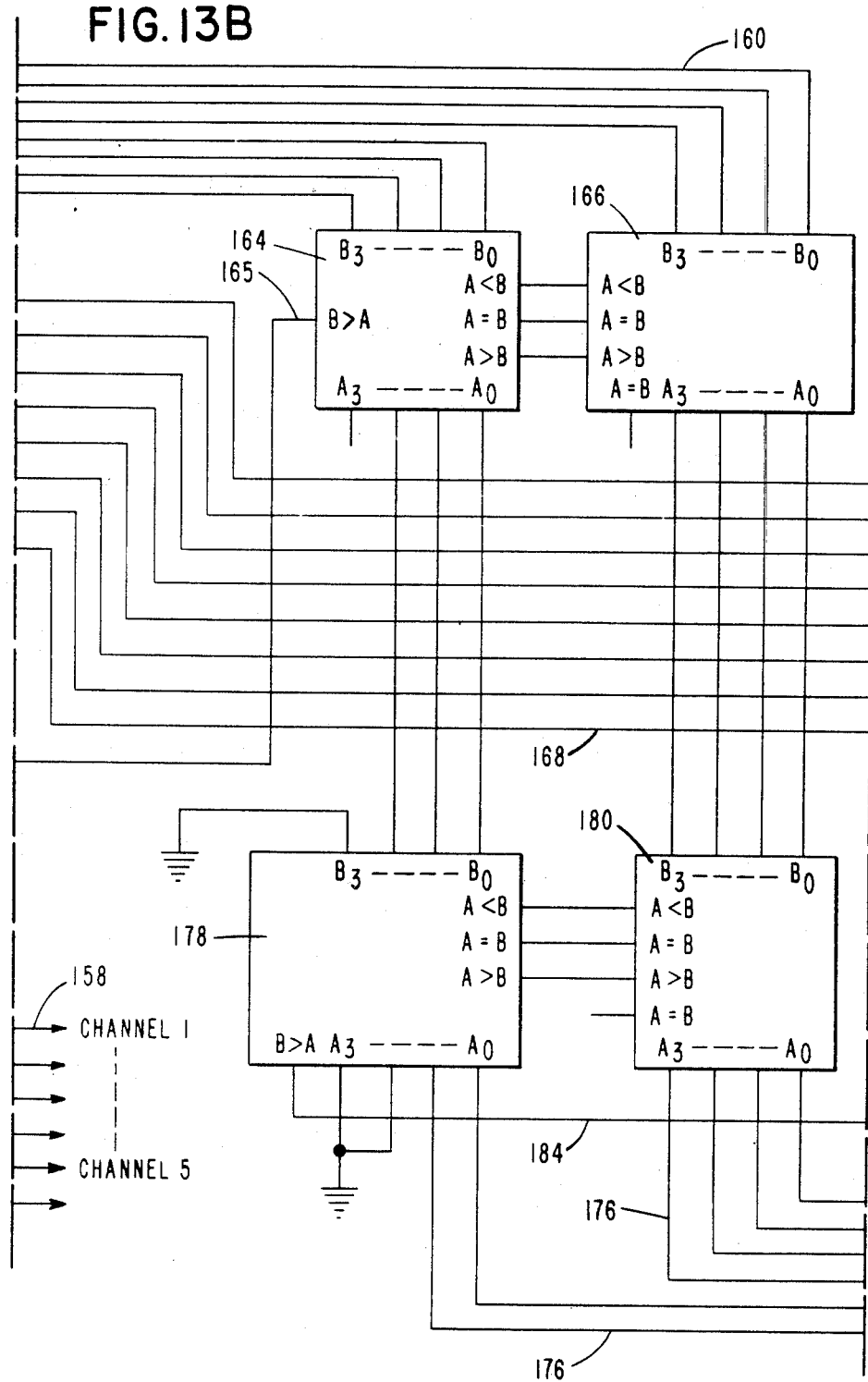
Figure 13C:
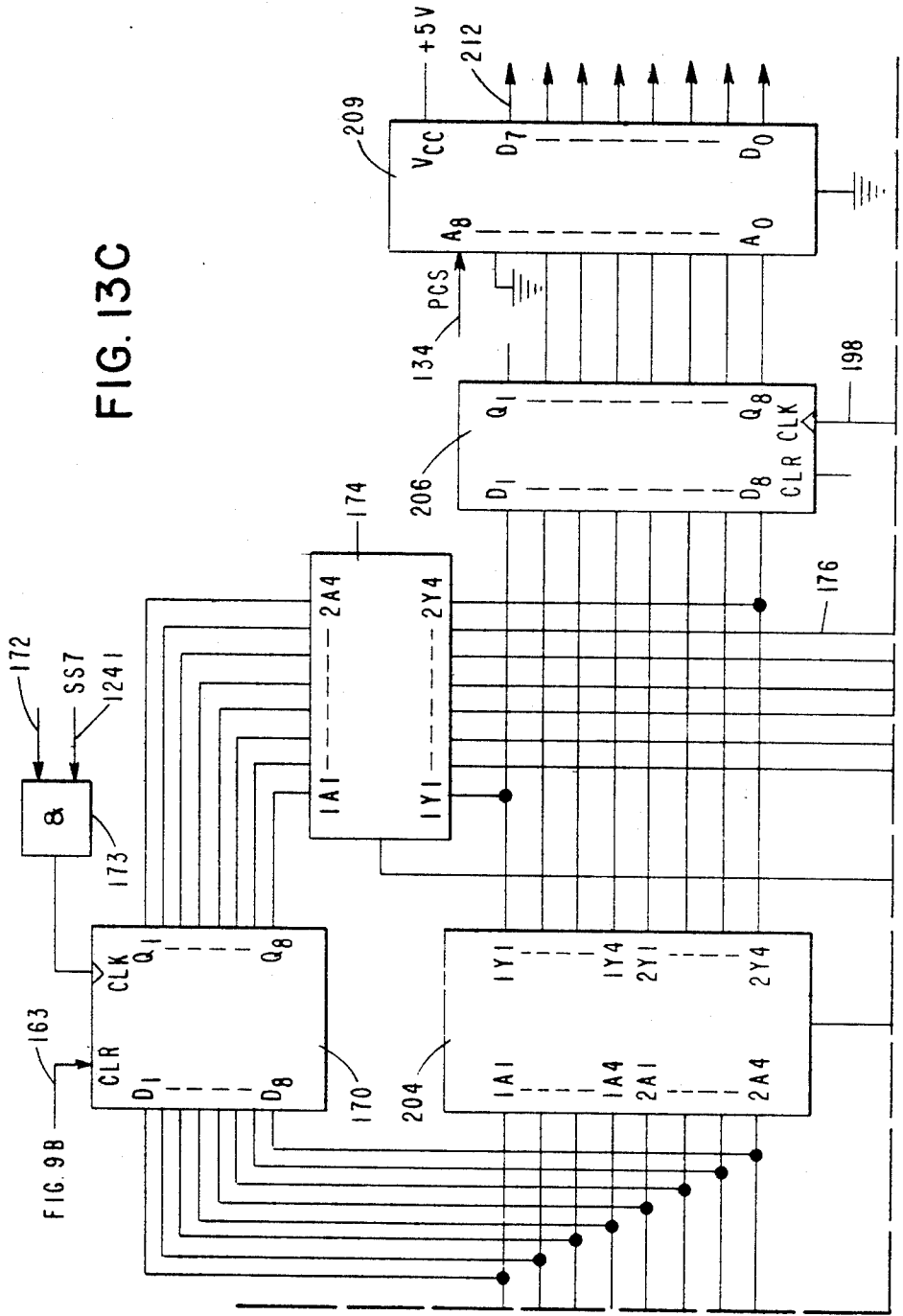

At the completion of the processing of the window, the peak value stored in latch 162 is outputted over lines 168 to a pair of 74LS85 comparators 178 and 180 (FIG. 13B) which compare the seven bits comprising the peak value level of the current window with the peak value level of the previous window which has been stored in the latch member 170 (FIG. 13c). When clocked by a control signal appearing on line 172 and which is gated through the AND gate 173 by the sequence control signal SS7 (FIG. 7B) appearing on line 124l, the peak value is transmitted through a 74LS244 buffer member 174 and over lines 176 to the comparators 178 and 180. If the peak value of the seven data bits of the current window is greater than one half of those bits of the previous window, a 74LS74 flip-flop 182, which receives a high signal over its D input line 184 from the comparator member 178, is clocked by a signal over line 186 which is derived from the output signal of the window generator 102 (FIG. 5C) comprising a 74LS393 counter 188 (FIG. 13D) clocked by two of the sequenced signals SS1 appearing on line 124b. Upon the counter 188 reaching a count of 7, an AND gate 192 will output a high signal over line 194 to the OR gate 196, line 198 and AND gate 200 whose output signal over line 186 will clock the flip-flop member 182. The AND gate 200 is enabled by the clock signal CLK3 (FIG. 27c) appearing on line 201 and the sequence control signal SS5 appearing on line 124g.

Depending on whether the flip-flop 182 is set or cleared, either the peak value of the current window or the previous window is outputted over lines 176 from the latch member 204 (FIG. 13C) to a second 74LS273 latch member 206 which is clocked by the high signal appearing on line 198 and transmitted through the AND gate 208 when enabled by the sequence control signal SS6 appearing on line 124d (FIG. 13D). The latch member 206 will output the selected seven data bits comprising the peak value to a 2716 EPROM member 209 which will generate a fixed or static threshold value over the output lines 212. As will be described more fully hereinafter, when in a dynamic threshold mode, the EPROM member 209 is programmed to divide the value of the inputted seven data bits representing the peak value of each window by a constant such as 6 or 8 representing an ink intensity value to produce a dynamic threshold value. The fixed threshold value and the dynamic threshold value are outputted over lines 212 to a 74LS244 buffer 214 (FIG. 12) which outputs the threshold values over lines 215.

Further included in the logic circuits shown in FIG. 13A is a 74LS42 decoder 216 which, in response to the output count of a 74LS39 counter 218, will output over lines 158 the channel select control signals CHANNEL 1-CHANNEL 5 inclusive which sequentially enables the buffer members 156a-156e inclusive (FIGS. 11A and 11B) to output the seven bits which comprise the current window for each of the CHANNELS 1-5 inclusive over lines 160 to the latch member 162 (FIG. 13A). The counter 218 is reset by the $\overline{Q}$ output signal of a 74LS74 flip-flop member 220 which is reset by a high signal appearing on the output line 222 of the decoder 216 and which is transmitted through the AND gate 224 to the clear input of the flip-flop 220. The latch member 162 (FIG. 13A) is reset by the Q output signal of a 74LS74 flip-flop 226 when clocked by the signal $\overline{SS8}$ (FIG. 7A) transmitted through the AND gate 228 over line 124j.

Figure 15B:
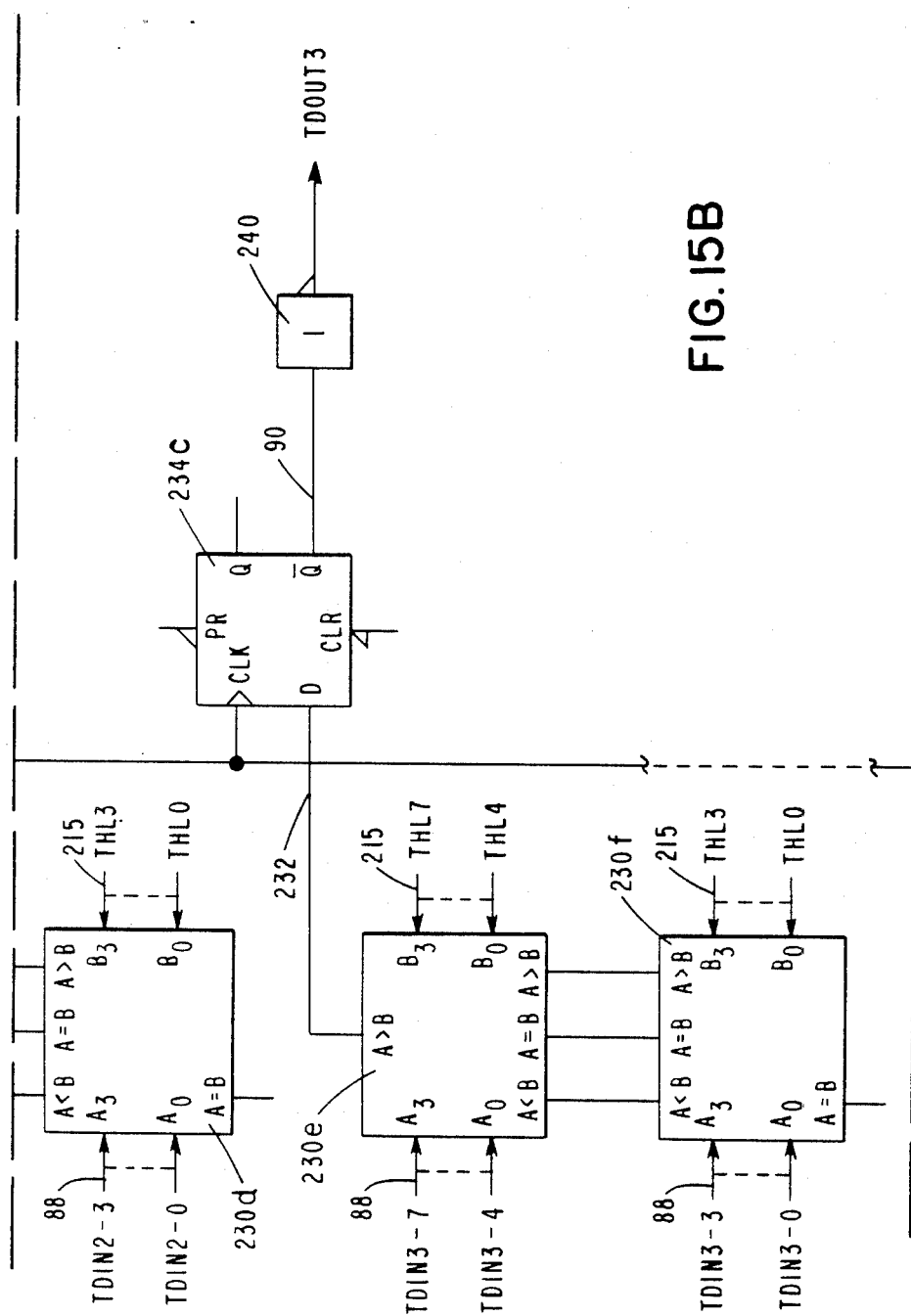
Figures 15C, 16:
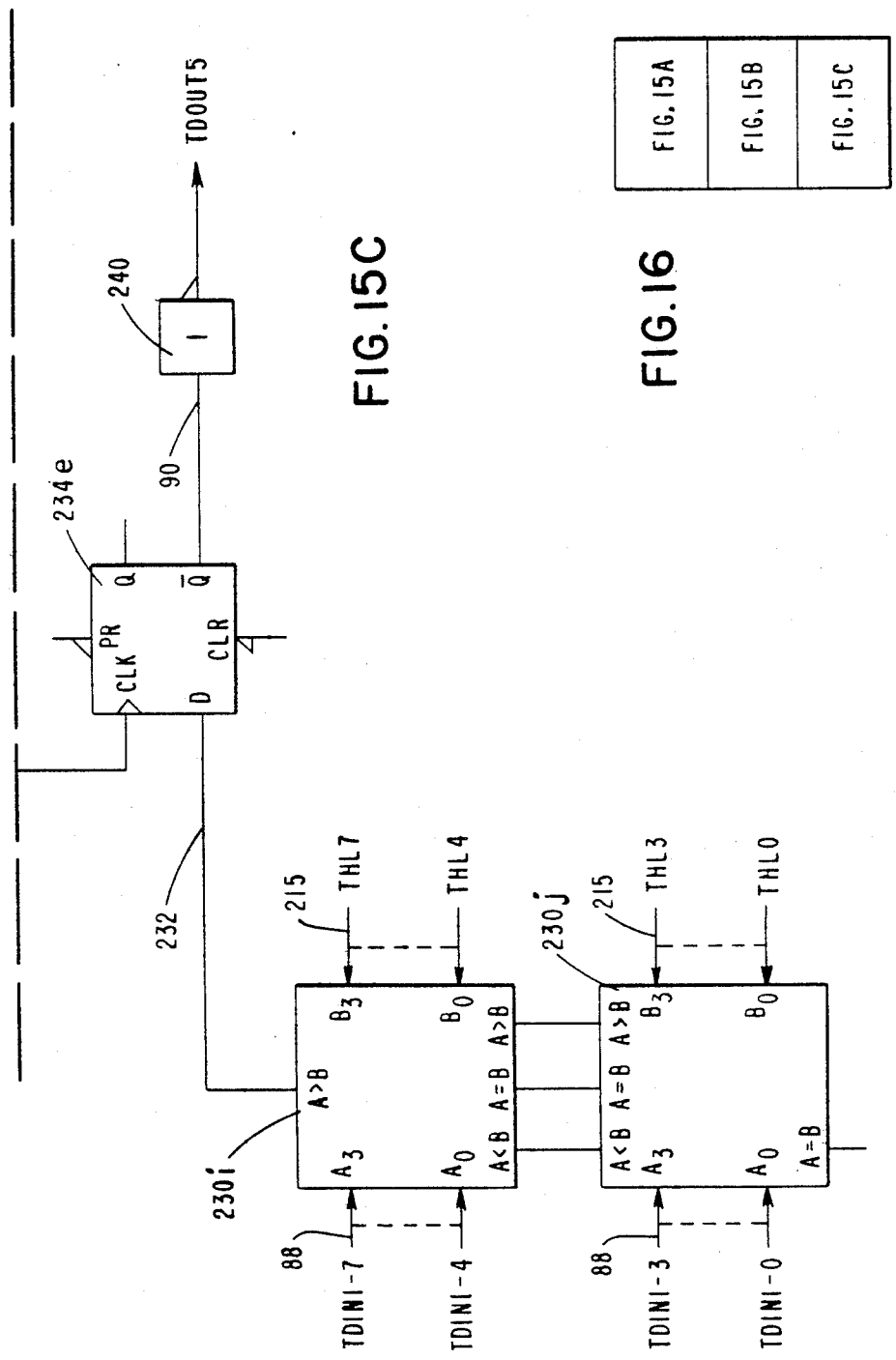
Figure 17A:
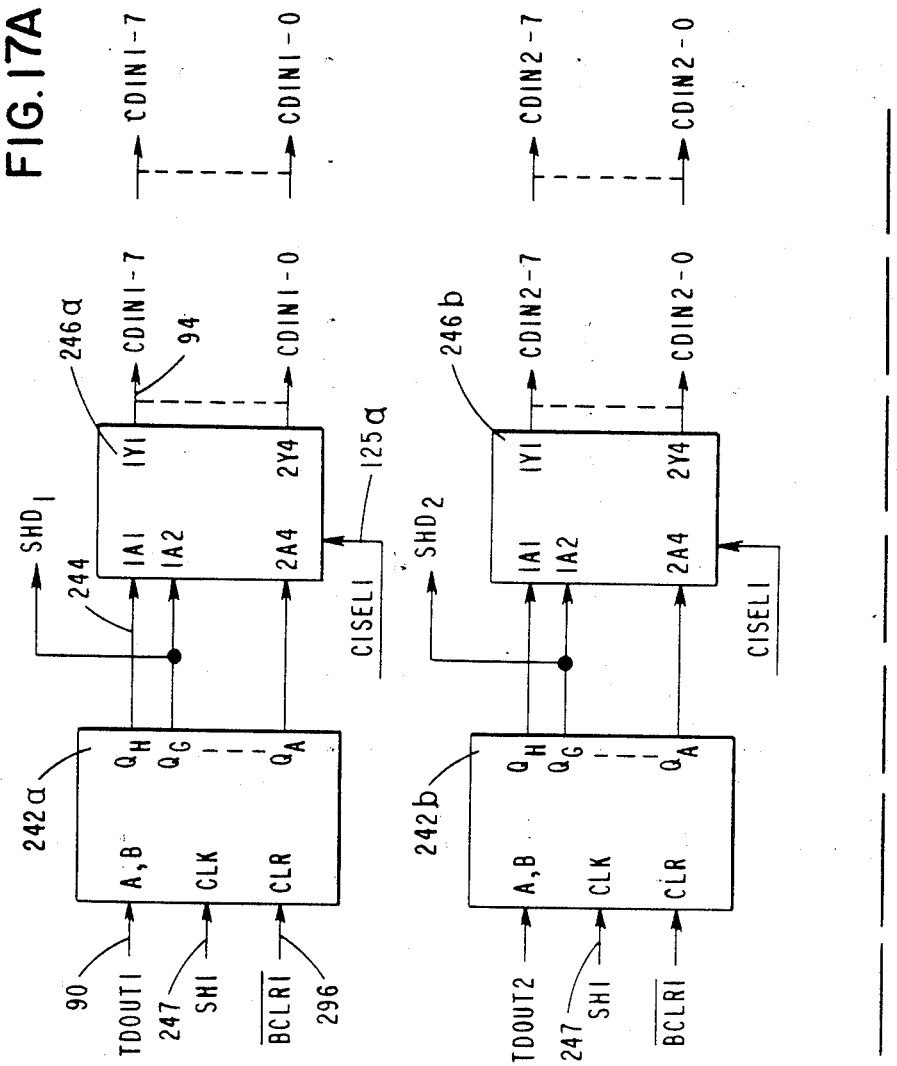
FIGS. 17A–17D inclusive, taken together, form a diagram of a portion of the logic circuits found in the character start unit of FIG. 5C.
Figure 18:
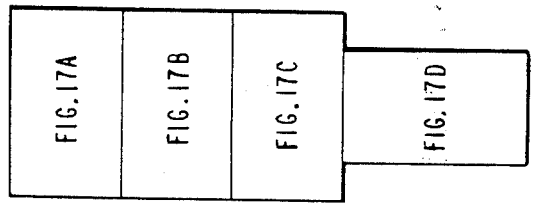
FIG. 18, on the sheet containing
Figure 17B:
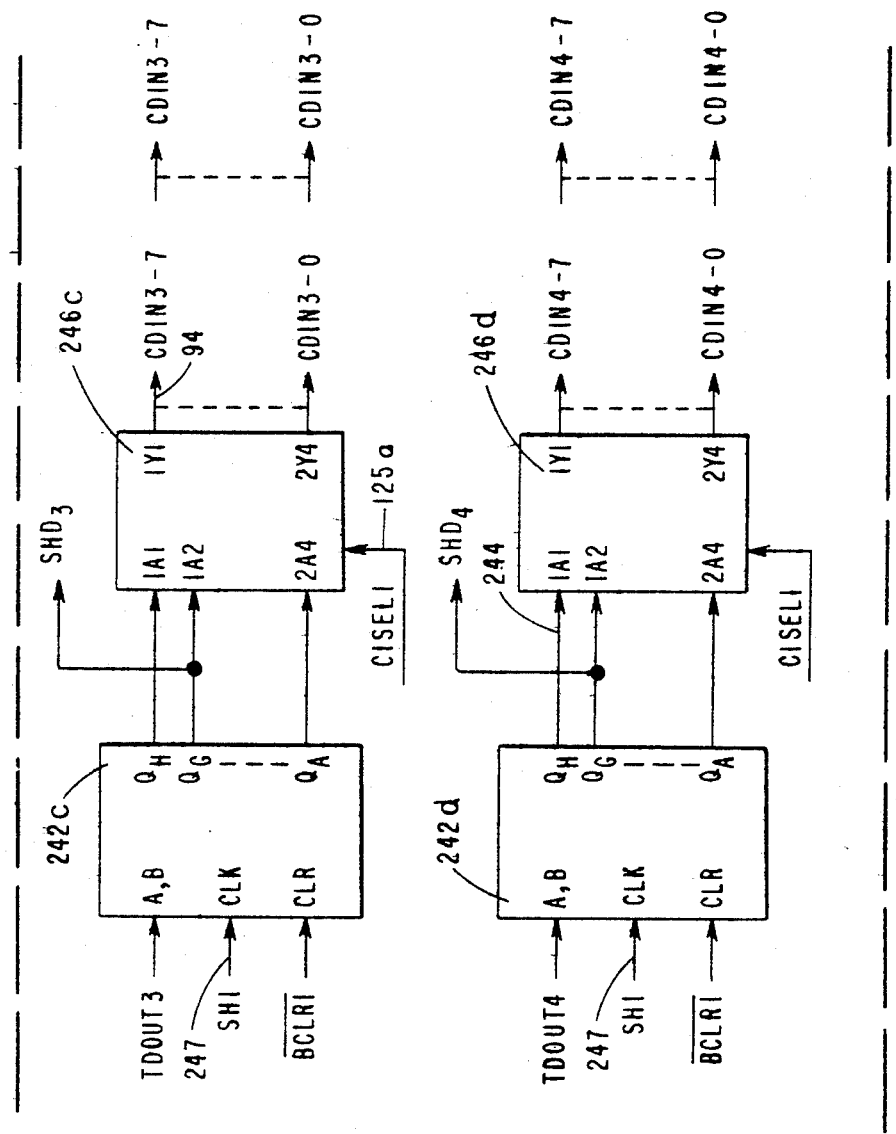
Figure 17C:
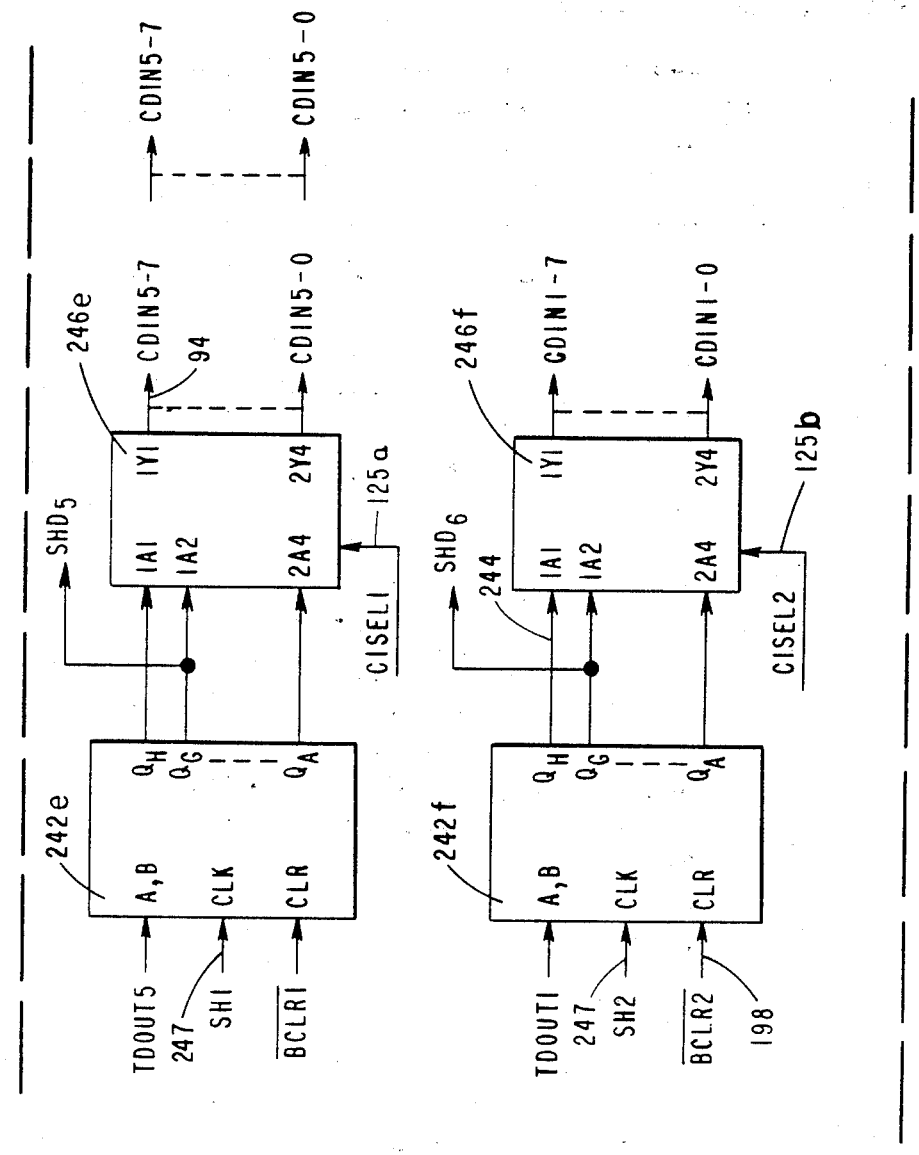
Figure 17D:
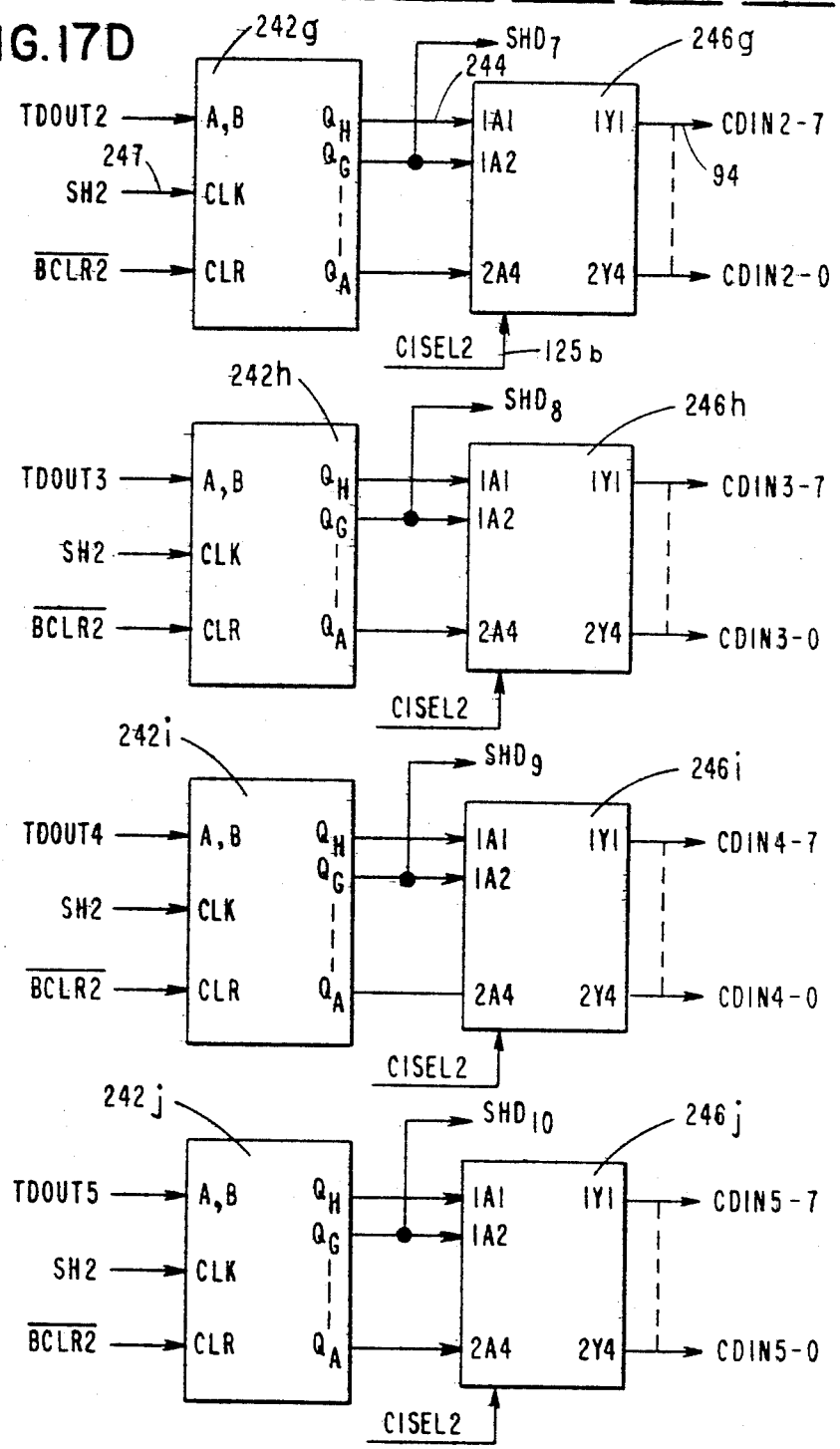
Figure 19A:
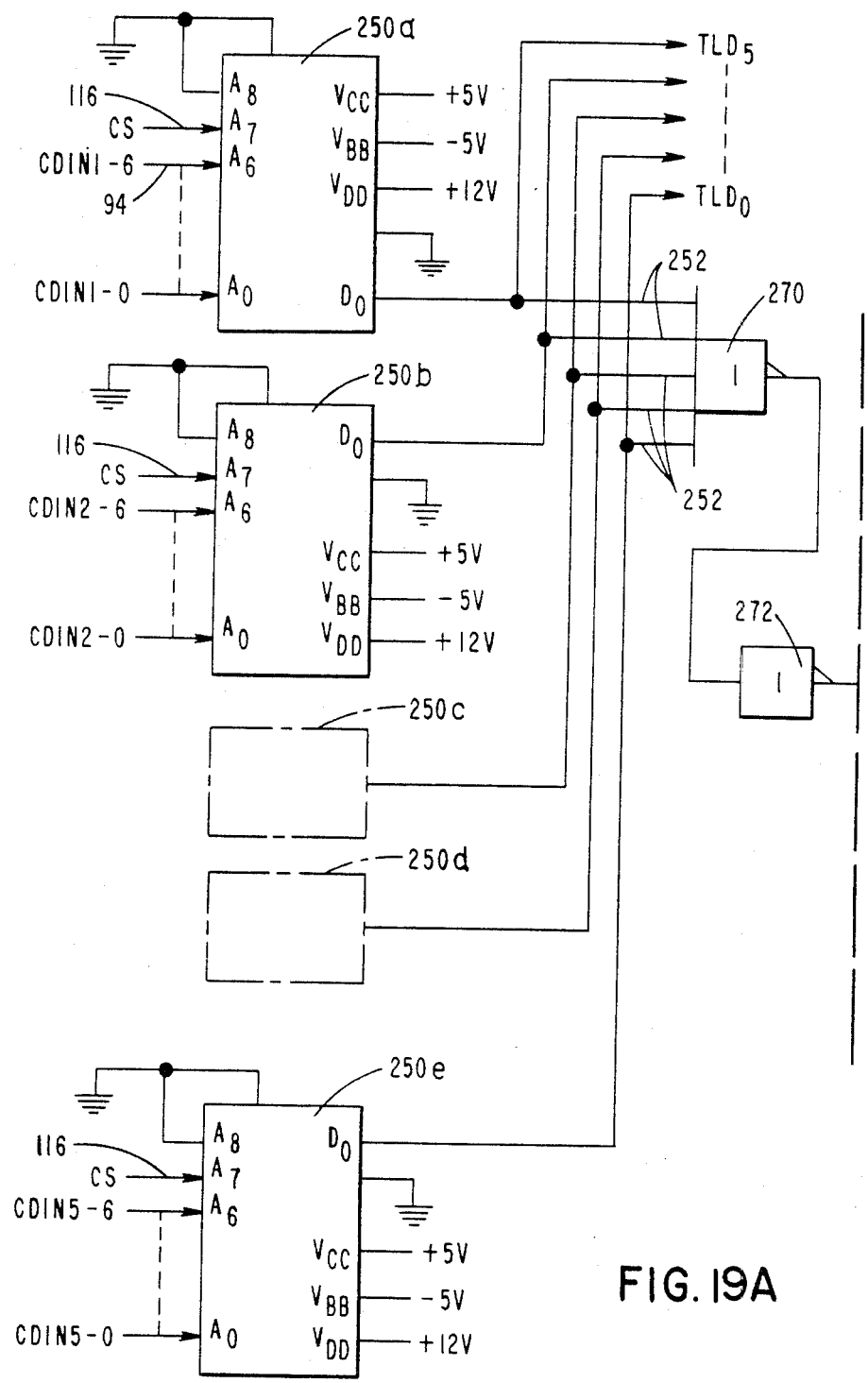
FIGS. 19A and 19B, taken together, form a diagram of the logic circuits of the lookup tables used in determining whether incoming data is a spot of ink or a blank.

The threshold value for each of the windows of each channel appearing on lines 215 (FIG. 12) is transmitted to a plurality of 74LS85 comparators 230a-230j inclusive (FIGS. 15A-15C inclusive) which compare the threshold values to the signal levels in each window for all ten channels appearing on lines 158. As previously described, prior to the generation of the pre-character start signal PCS, the data bits outputted by the buffers 126a-126e inclusive (FIG. 8) are compared to a fixed threshold value while after the generation of the signal, the same data bits outputted from the buffers 132a-132e (FIGS. 9A and 9C) which are delayed seven bit times is compared to a dynamic threshold value based on the peak value of the data bits appearing in the first window. When the value of the data bits appearing on the input lines 88 exceeds the threshold value appearing on lines 215, the comparators 230a-230j will output a high signal on lines 232 which is inputted into the D input of the 74LS74 flip-flops 234a-234e (FIGS. 15A-15C inclusive. The flip-flops, when clocked by the timing signal $\overline{WRTR1}$ appearing on line 236, will output a signal over lines 90 which is inverted by the inverters 240 and then transmitted to a plurality of 74LS164 serial-in-parallel-out registers 242a-242j (FIGS. 17A-17D inclusive) which output the signals over lines 244 to a plurality of 74LS244 buffer members 246a-246j inclusive when clocked by the shift signals SH1 and SH2 appearing on lines 247. The signals are then outputted over lines 94 to a plurality of 27A08L EPROM members 250a-250e inclusive (FIG. 19A) in response to the generation of the signal CISEL1 appearing on line 125a and CISEL2 appearing on line 125b. The EPROM members 250a-250e inclusive in response to receiving the first seven bits of data from each window will determine if each bit is an ink spot or a blank spot and the presence of the start of a character.

Figures 19B, 20:
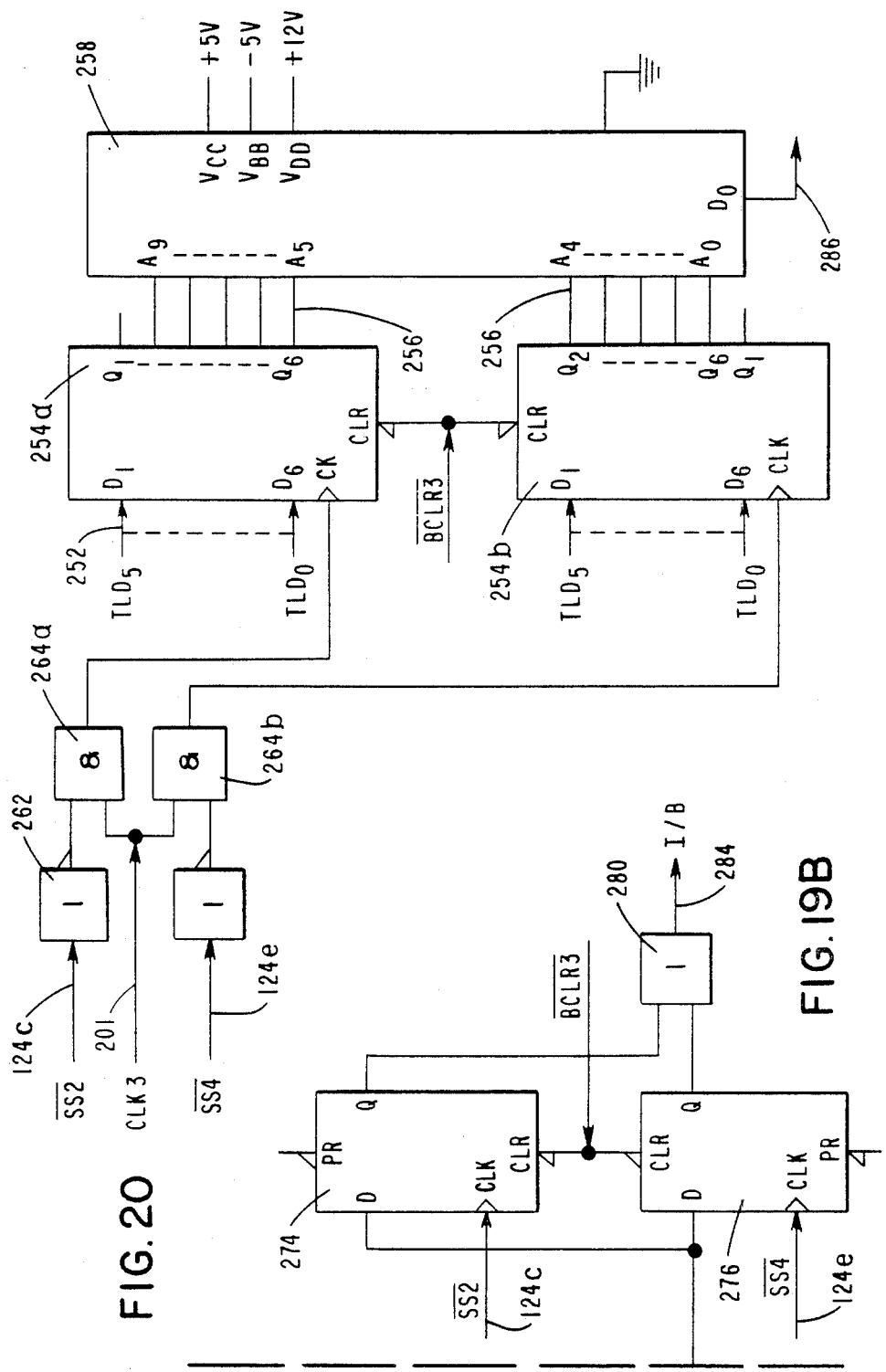
FIG. 20 is a diagram of the logic circuits used in the character start unit of FIG. 5D.

If as previously described, the EPROM members 250a-250e inclusive find that the seven bits in the first window do not contain two consecutive blank bits, a high signal will appear on lines 252 which is latched in the 74LS273 latch members 254a and 254b (FIG. 20). The latch member 254a will store the results for each window processed in channels 1-5 while latch 254b will store the results for channels 6-10. The signals stored in latch 254a are clocked out over lines 256 to a 2708L EPROM 258 by the sequence control signal $\overline{SS2}$ (FIG. 27e) which appears on line 124c. This signal is inverted by the inverter 262 and clocked through the AND gate 264a by the clock signal CLK3 (FIG. 27c) appearing on line 201. In a similar manner, the signals stored in latch 254b are clocked by the sequence control signal $\overline{SS4}$ (FIG. 27e) appearing on line 124e and which is clocked through the AND gate 264b.

The signals appearing on lines 252 are also inputted into a NOR gate 270 (FIG. 19A) whose output signal is inverted by the inverter 272 and inputted into the D input of a pair of 74LS74 flip-flops 274 and 276 (FIG. 19B). The flip-flop 274 is clocked by the sequence control signal $\overline{SS2}$ (FIG. 27e) appearing on line 124c to clock the signals of the upper five channels. Similarly, the flip-flop 276 is clocked by the sequence control signal $\overline{SS4}$ appearing on line 124e to latch the signals of the lower five channels. If the signal appearing on lines 252 represents an ink spot, the OR gate 280 will output a high signal I/B over line 284, while if the signal represents a blank spot, the signal I/B will be low. As will be described more fully hereinafter, the signal I/B is used in determining the end of character signal.

Figure 21B:
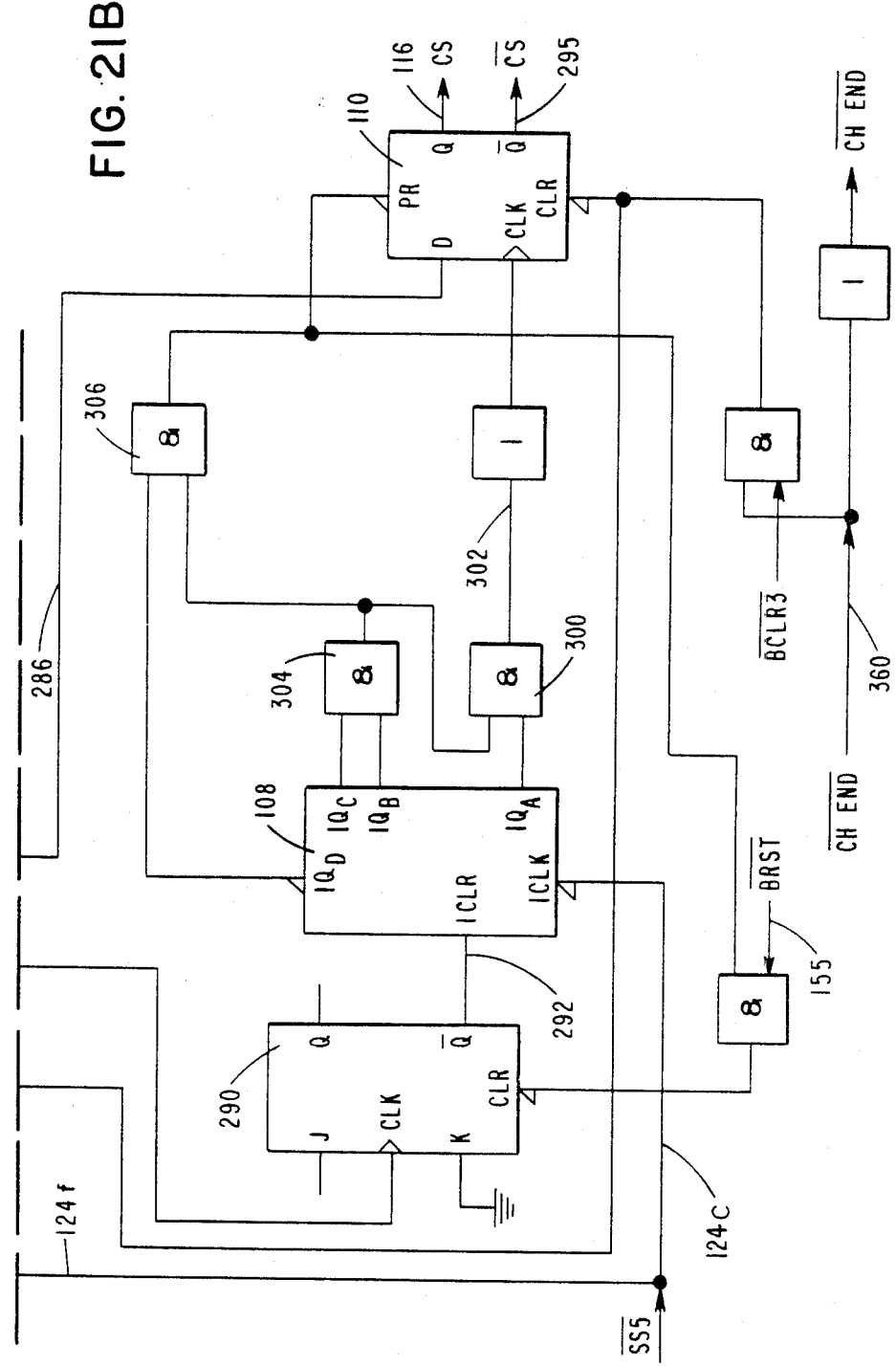

The EPROM 258 (FIG. 20), comprising a lookup table, will compare the windows in each of the ten channels. If the corresponding windows in two channels are indicated to comprise an ink spot, a high signal will appear on the output line 286 of the EPROM member 258 indicating the start of a character. This signal is inputted into the J input of the pre-character flip-flop 98 (FIGS. 5D and 21A) which, when clocked by the sequence control signal $\overline{SS5}$ appearing on line 124f, will output the pre-character start signal PCS (FIG. 27e) over line 52. As described previously, the signal PCS will enable the EPROM member 209 (FIG. 13C) to generate a dynamic threshold value by dividing the maximum peak value of the binary bits comprising the first window by a constant. The signal PCS appearing on line 52 is also inputted through the OR gate 289 (FIG. 9B) enabling the buffer members 132a–132e inclusive (FIGS. 9A and 9C) to output the delayed data bits comprising the windows of each of the channels to which the dynamic threshold value is applied to locate the start of the character scanned.

The clocking of the flip-flop 98 (FIG. 21A) by the sequence control signal $\overline{SS5}$ appearing on line 124f results in the Q output signal clocking a second 74LS107 flip-flop 290 (FIG. 21B) whose Q output signal over line 292 enables the 74LS293 window counter 108 (FIG. 5D) thereby initiating a new counting operation. A high signal appearing on line 286 will go low at the start of the operation of the counter 108 as a result of the clocking of a flip-flop 294 (FIG. 21A) by the precharacter start signal PCS appearing on line 52. The flip-flop 294 will output the clear signals $\overline{BCLR1}$ over line 296 and $\overline{BCLR2}$ over line 298, clearing the serial-in-parallel-out registers 242a–242f inclusive (FIGS. 17A–17D inclusive) resulting in the output signal of the EPROM 258 (FIG. 20) appearing on line 286 going low. If the counter 108 reaches a count of 7 which corresponds to the number of bits in the first window, the AND gate 300 will be enabled to output a high signal over line 302 to clock the flip-flop 110. If at this time, a high signal has appeared on line 286 indicating the presence of a character start, the flip-flop 110 will output the character start signal CS over line 116 to the character delay logic unit 100 (FIG. 5D). If at the end of the first window a character start has not been detected, the counter 108 will continue counting up to 14 at which time, the output count signals of the counter 108 enables the AND gates 304 and 306 to preset the flip-flop 110 to output the character start signal CS over line 116 and the signal $\overline{CS}$ over line 295. It will be seen that this logic circuit will establish the character start in the second window when the character start is not found in the first window processed.

Figure 4:
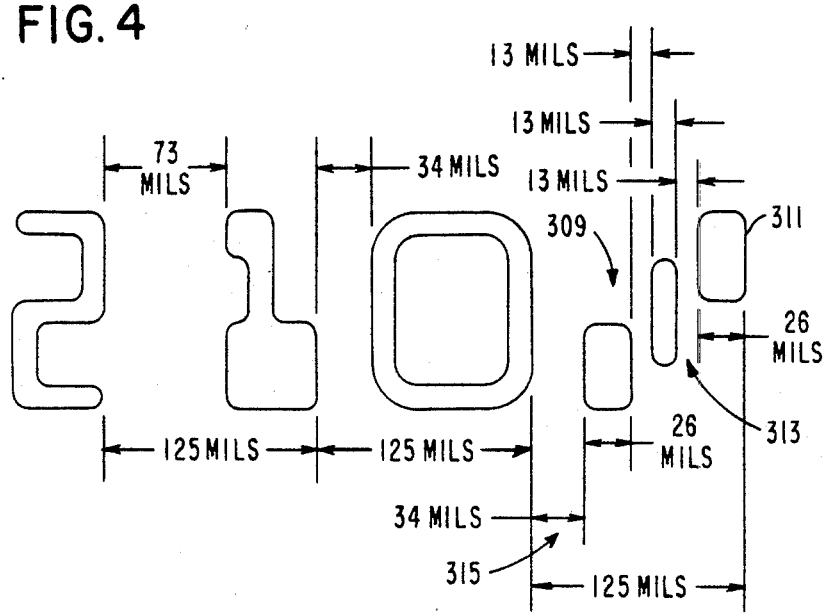
FIG. 4 is a schematic diagram of the print specifications required in the printing of a number of standard E-13B characters.
Figure 22A:
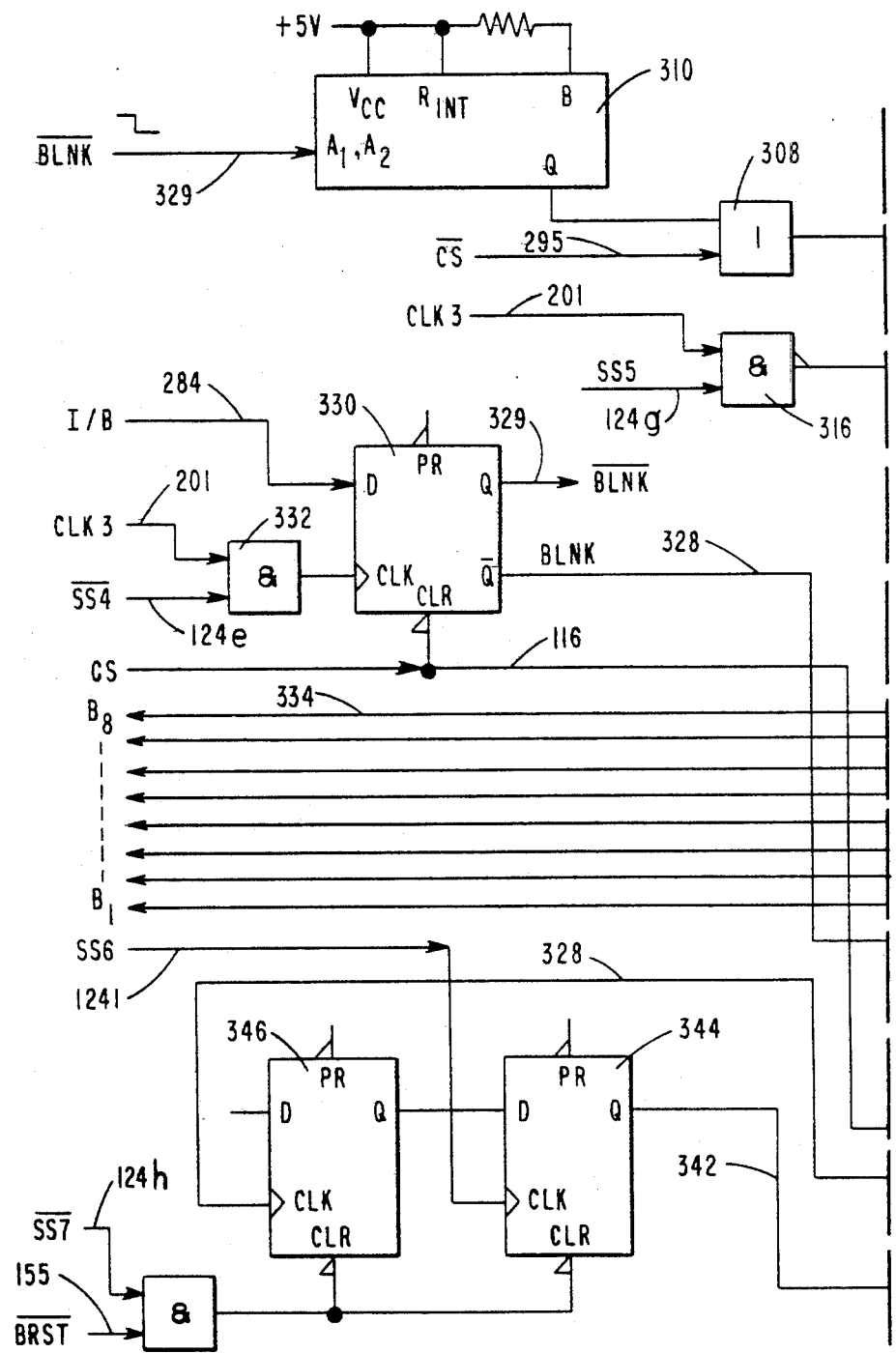
Figure 22B:
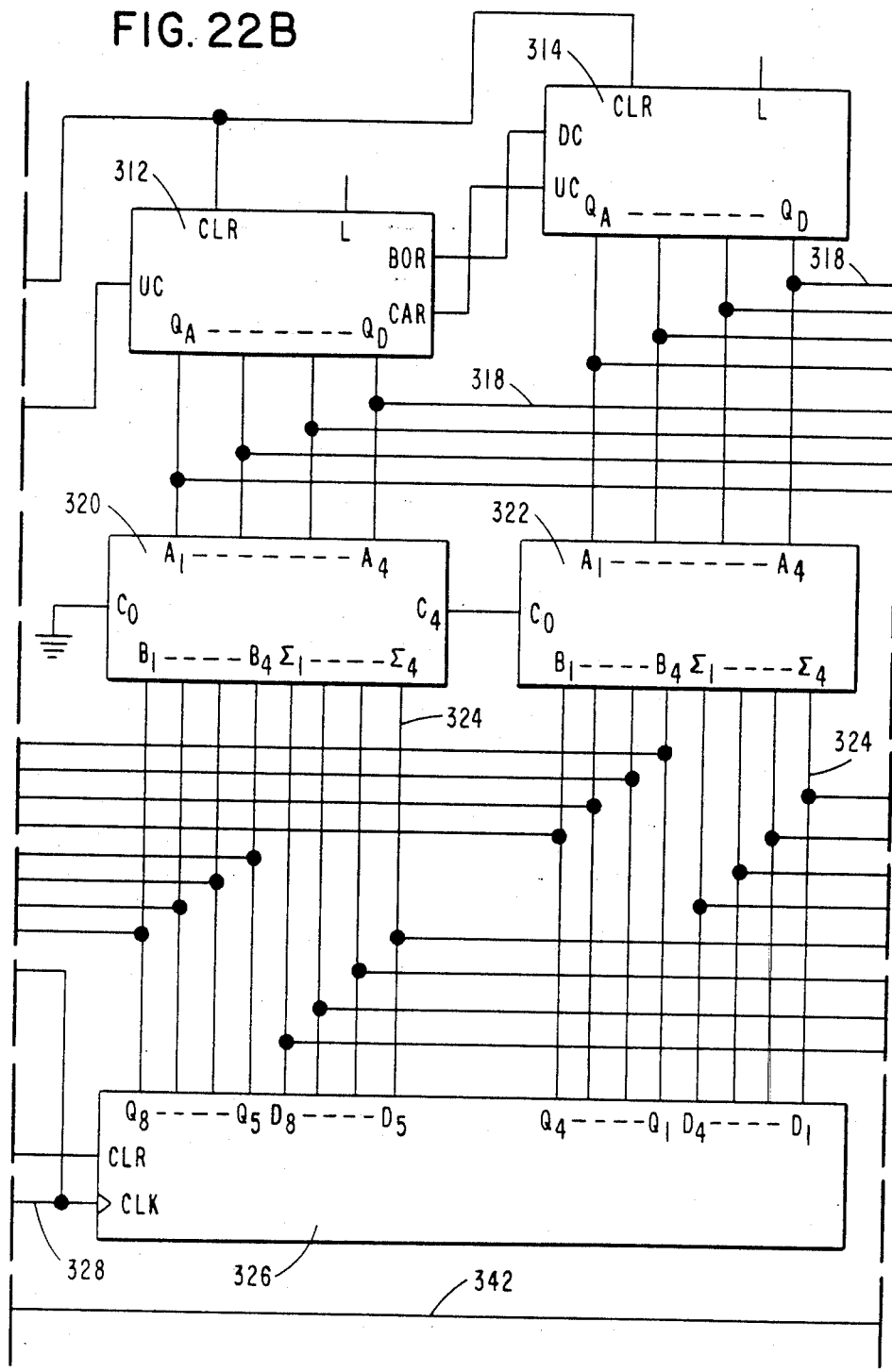

Upon the finding of a character start, the signal CS appearing on the Q output line 295 of flip-flop 110 (FIG. 21B) is inputted into the character end detection logic unit 112 (FIG. 5D) which includes an OR gate 308 (FIG. 22A). The OR gate 308 also receives the output signal of a 74LS121 multivibrator member 310, which signal (FIG. 27i) goes high when a transition occurs between an ink spot and a blank spot representing the end of a black bar portion of a character. As shown in FIG. 4, the number of bits of the right hand amount character indicated generally by the numeral 309 may comprise three bars 311 whose width may vary between 13 mils and 26 mils. In order to determine the end of the character which may include blank spaces between the black bar portions of the character, the output of the OR gate 308 (FIG. 22A) is connected to the clear input of a pair of 74LS193 counters 312 and 314 (FIG. 22B). The counters 312 and 314 when enabled by the appearance of the character start signal $\overline{CS}$ on line 295 will count the width of the character read represented by the clock pulses CLK3 (FIG. 27c) appearing on line 201 and transmitted through a NAND gate 316. The output count of the counters 312 and 314 are inputted over lines 318 to a pair of 74LS283 adders 320 and 322 (FIG. 22B) which accumulate the input count to produce on output lines 324 the total bit width of the character being scanned or the blank space between the characters.

The output lines 324 of the adders 320 and 322 are connected to a 74LS273 latch member 326 which is clocked by the signal $\overline{BLNK}$ (FIG. 27i) outputted over line 329 of a 74LS74 flip-flop 330 (FIG. 22A). The flip-flop 330 receives over line 284 the signal I/B (FIG. 19B) indicating whether the binary bit being examined is an ink spot (1) or a blank spot (0). The flip-flop 330 is clocked by the clock signals CLK3 (FIG. 27c) appearing on line 201 and transmitted through the AND gate 332 by the sequence control signal $\overline{SS4}$ (FIG. 27e) appearing on line 124e (FIG. 7A). The flip-flop 330 is also enabled by the character start signal CS appearing on line 116. When the signal I/B goes from high to low indicating the end of a black bar of a character, the signal BLNK appearing on the output line 328 of the flip-flop 330 will go high, clocking the latch member 326 which latches the width of the black bar appearing on the output lines 324 of the adders 320 and 322. The changing of the voltage level of the signal I/B also enables the flip-flop 330 to output the low signal $\overline{BLNK}$ over line 329 which enables the multi-vibrator member 310 to output a high signal through the OR gate 308 which clears the counters 312 and 314. The counters 312 and 314 will now start counting the width of the blank space the total of which is outputted over lines 324 by the adders 320 and 322 (FIG. 22B). When the signal I/B goes high indicating the start of the next black bar, the counter will again be cleared and start another count representing the width of the black bar. The width of the black bar being scanned will also be outputted over lines 334 for use in generating marker signals indicating the end of the character scanned.

The data signals representing the total width of the black bar appearing on lines 324 is inputted into a 2708 EPROM member 336 (FIG. 22D) which, in response to the value of the input data representing the width of the character appearing on lines 324, will output over lines 338 a value representing the number of blank columns or bits which must follow the transition from ink to blank to have a valid end of character condition. Referring again to FIG. 4, it will be seen that the width of the first black bar 311 of the amount character 309 will be 26 mils before the occurrence of the blank space 313 comprising 13 mils wide. After arriving at the total width of 26 mils for bar 311, this data will be inputted into the EPROM member 336 which will output data signals indicating a certain width of the blank space 315 required to constitute a valid end of character condition which, in this example, is greater than 13 mils. Since the first blank space 313 is only 13 mils wide, an end of character condition does not exist at this time. This operation will be repeated until the required blank column greater than 13 mils is scanned. The data outputted by the EPROM member 336 representing the width of the blank column which must exist before an end of character condition is clocked over lines 338 to a 74LS273 latch member 340 (FIG. 22D) by a clock signal (FIG. 27j) outputted over line 342 from a 74LS74 flip-flop 344 which receives the output signal of a second 74LS74 flip-flop 346 clocked by the signal BLNK over line 328 (FIG. 22A). The flip-flops 344 and 346 delay the clock signal appearing on lines 342 by two clock signals enabling the EPROM member 336 to process the input data appearing on lines 324.

Figure 22C:
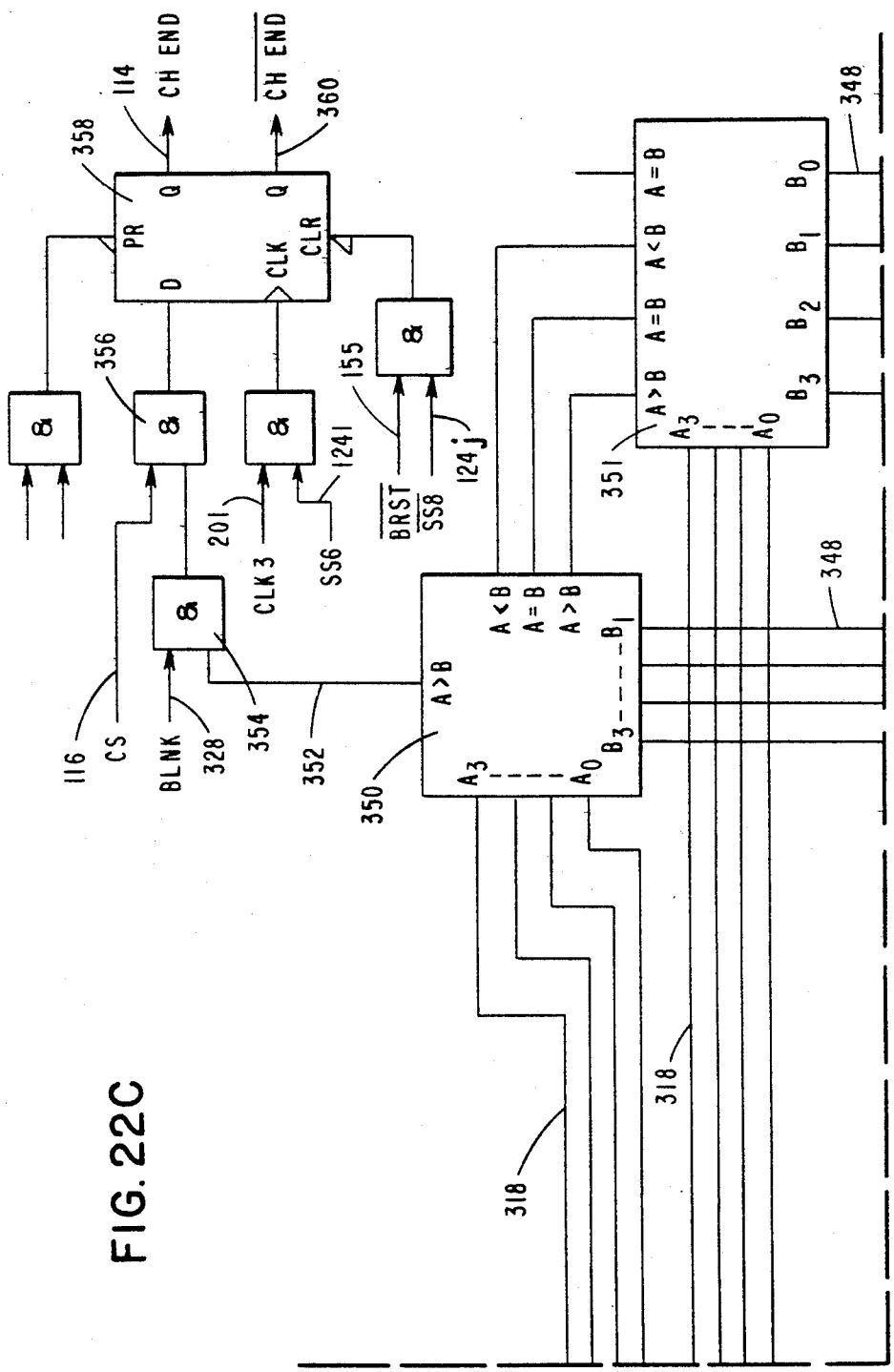

The data signals stored in the latch member 340 are outputted over lines 348 (FIG. 22D) to a pair of 74LS85 comparators 350 and 351 (FIG. 22C) which compares the blank width requirements for an end of character condition with the output of the counters 312 and 314 (FIG. 22B) which at this time are counting the blank columns being scanned. If the output count appearing on lines 318 representing the width of the blank space exceeds the value appearing on lines 348, a high signal will appear on line 352 of the comparator 350 which signal is gated by the AND gate 354. The AND gate 354 is enabled by the signal BLNK appearing on line 328. The AND gate 356 is enabled by the character start signal CS (FIG. 27g) appearing on line 116. The output signal of the AND gate 356 is inputted into the D input of a 74LS74 flip-flop 358. The flip-flop 358 is clocked by the signal CLK3 (FIG. 27c) appearing on line 201 and the sequence control signal SS6 appearing on line 124l (FIG. 7A). Clocking of the flip-flop 358 results in the outputting of the end of character signal CH END (FIG. 27k) appearing on line 114 which, after being delayed by the character delay logic circuit 100 (FIG. 5D), is transmitted to the image extraction logic unit 58 (FIG. 1). The inverted character end signal $\overline{CHND}$/ appearing on the output line 360 of the flip-flop 358 will disable the flip-flop 110 (FIG. 21B) from outputting the character start signal CS.

Figure 24A:
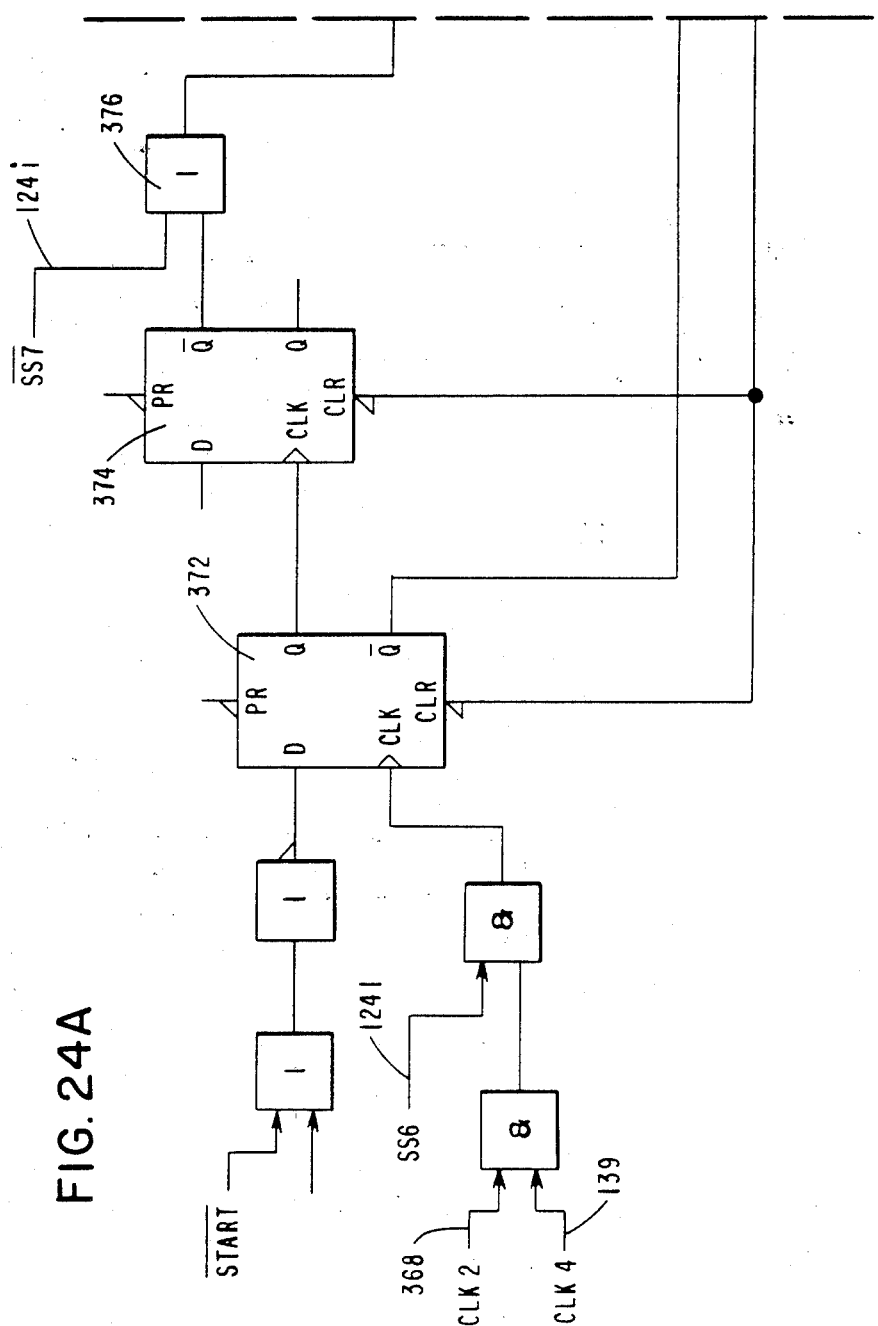
FIGS. 24A and 24B, taken together, form a diagram of further logic circuits used in the character end detection logic unit of FIG. 5D to generate signals indicating the location of the end of the character.
Figure 24B:
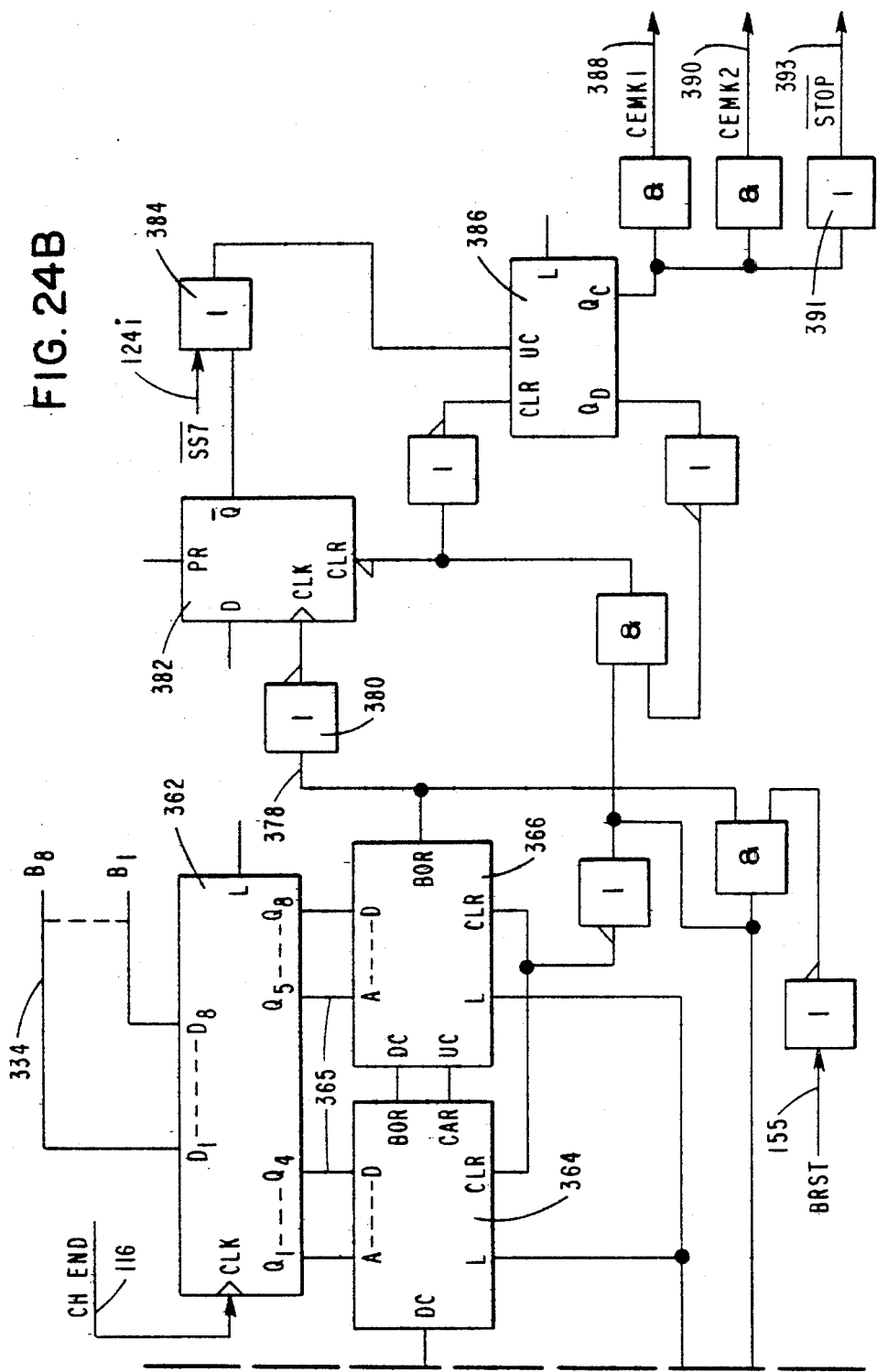
Figure 28A:
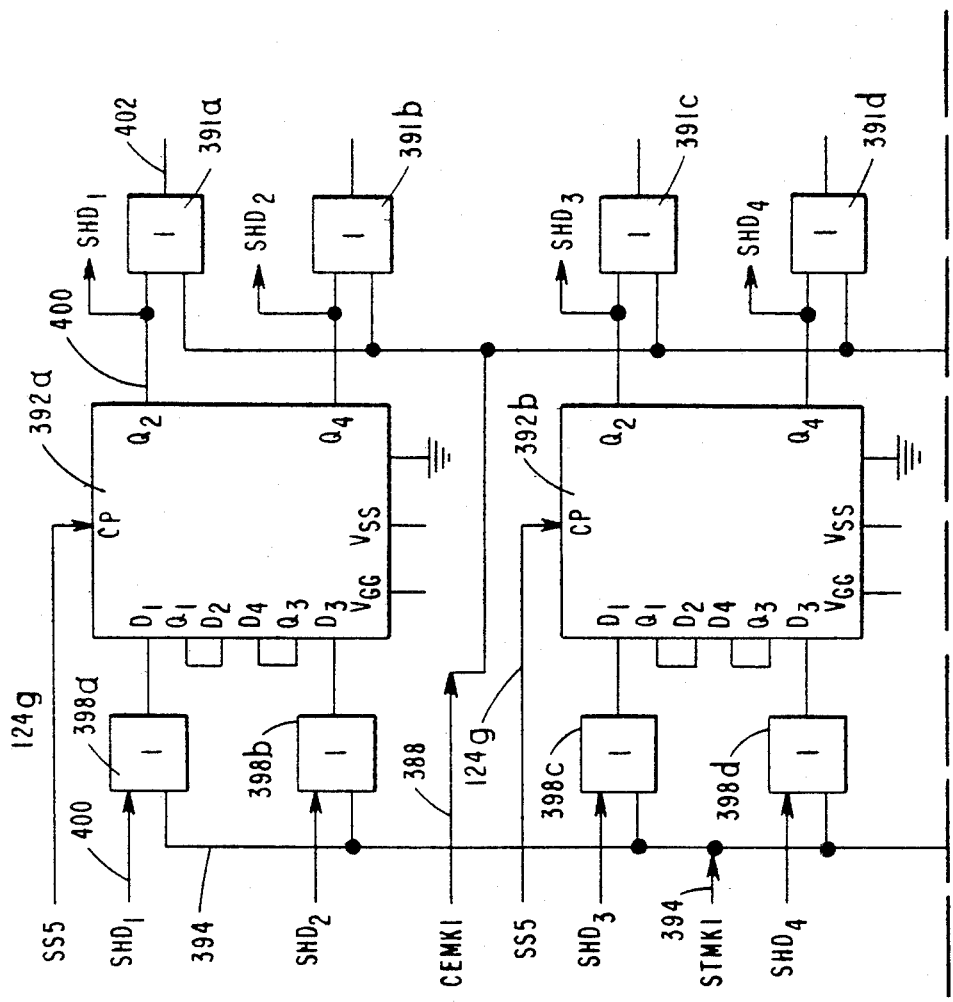
FIGS. 28A–28C taken together form a diagram of the logic circuits for delaying the data and inserting start and end of character markers in the data bit stream.
Figure 28B:
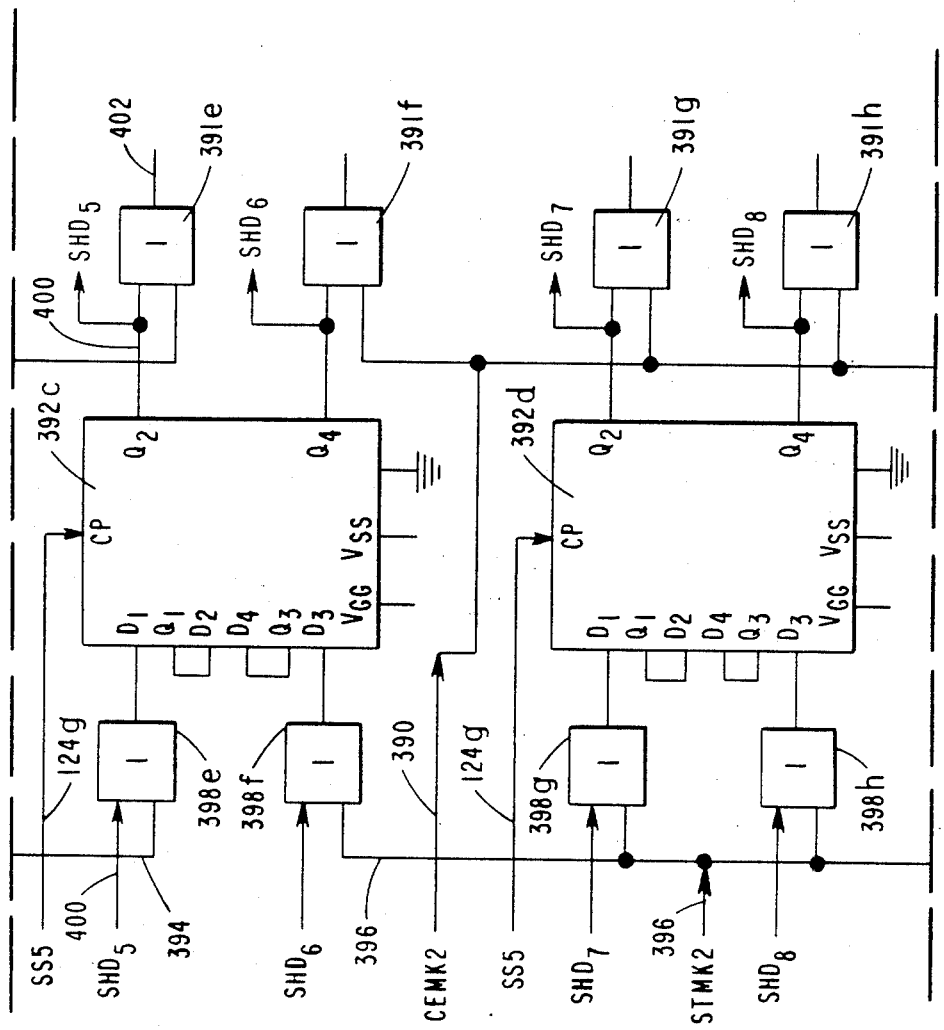
Figure 28C:
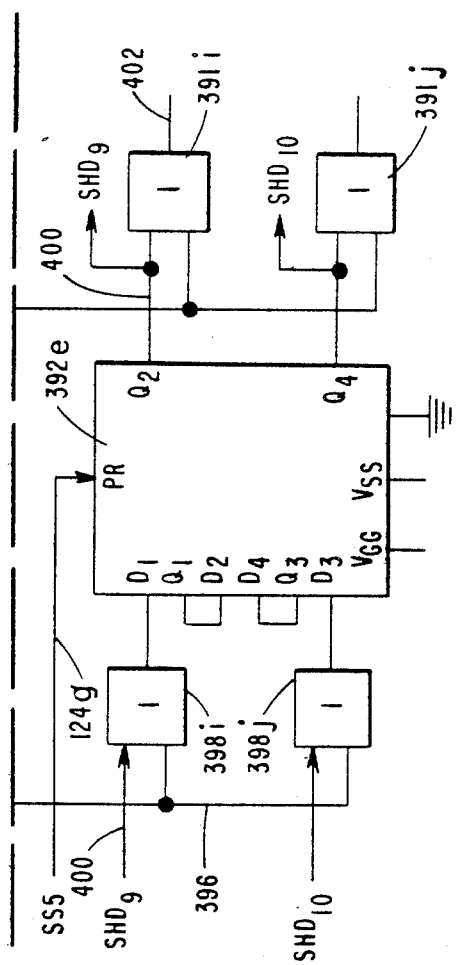
Figure 29:
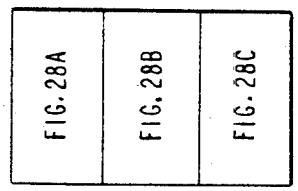
FIG. 29 is a diagram showing the manner in which FIGS. 28A–28C inclusive are arranged to form the block diagram.

The data bits appearing on lines 334 (FIG. 22A) representing the width of the character being scanned is transmitted to a 74LS273 latch member 362 (FIG. 24B) which is clocked by the signal CH END appearing on line 116. The value of the character width stored in the latch member 362 is loaded into a pair of 74LS193 counter members 364 and 366 (FIG. 24B) by a signal (FIG. 27m) appearing on lines 365 and which are clocked by the clock signals CLK2 (FIG. 27b) and CLK4 (FIG. 27d) appearing on lines 368 and 139 respectively. These signals will clock a pair of 74LS74 flip-flops 372 and 374 which output a clock signal (FIG. 27n) through the OR gate 376 to the clock input of the counter member 364. The counter members 364 and 366 will count down from the value of the character width inputted into the counters from the latch member 362. Upon reaching a count of 0, the counter 366 will output a high signal over line 378 which is inverted by the inverter 380 to clock a 74LS74 flip-flop 382. In order to delay the generation of an end of character marking signal, the $\overline{Q}$ output signal of the flip-flop 382 is gated through an OR gate 384 to a 74LS193 counter 386 (FIG. 24B) which upon reaching a predetermined count will output the end of character marking signals CEMK1 over line 388 and CEMK2 over line 390 and the inverted end of character signal $\overline{STOP}$ will be outputted by the inverter 391 over line 393. The signals CEMK1 and CEMK2 are transmitted to a series of OR gates 391a–391j inclusive (FIGS. 28A–28C inclusive) which also receive the data bits stored in a plurality of 3342 FIFO registers 392a–392e inclusive which store up to 128 bits representing the width of a character.

As shown in FIG. 4, the maximum width between the characters is 125 mils. In order to locate the start of the character being scanned within the data bits being transmitted to the image extraction logic unit 58 (FIG. 1), a start of character marker in addition to the end of character marker is inserted in the data bits. Upon the generation of the character start signal CS (FIG. 21B), the signal will clock a flip-flop (not shown) which outputs a pair of start of character marker signals STMK1 and STMK2 over lines 394 and 396 respectively into the OR gates 398a–398j inclusive (FIGS. 28A–28C inclusive) which also receive the delayed data bits $SHD_1$–$SHD_{10}$ inclusive outputted by the shift registers 392a–392e over lines 400. The data bits representing the character scanned are outputted from the OR gates 391a–391j over lines 402 which comprise the bus 56 (FIG. 1) to the image extraction logic unit 58 in response to the clock signals SS5 appearing on lines 124g of the end of character marker signals CEMK1 and CEMK2 appearing on lines 388 and 390 and inputted into the OR gates 391a–391j inclusive, which will also result in the data being transmitted to the image extraction logic unit 58.

Figure 26:
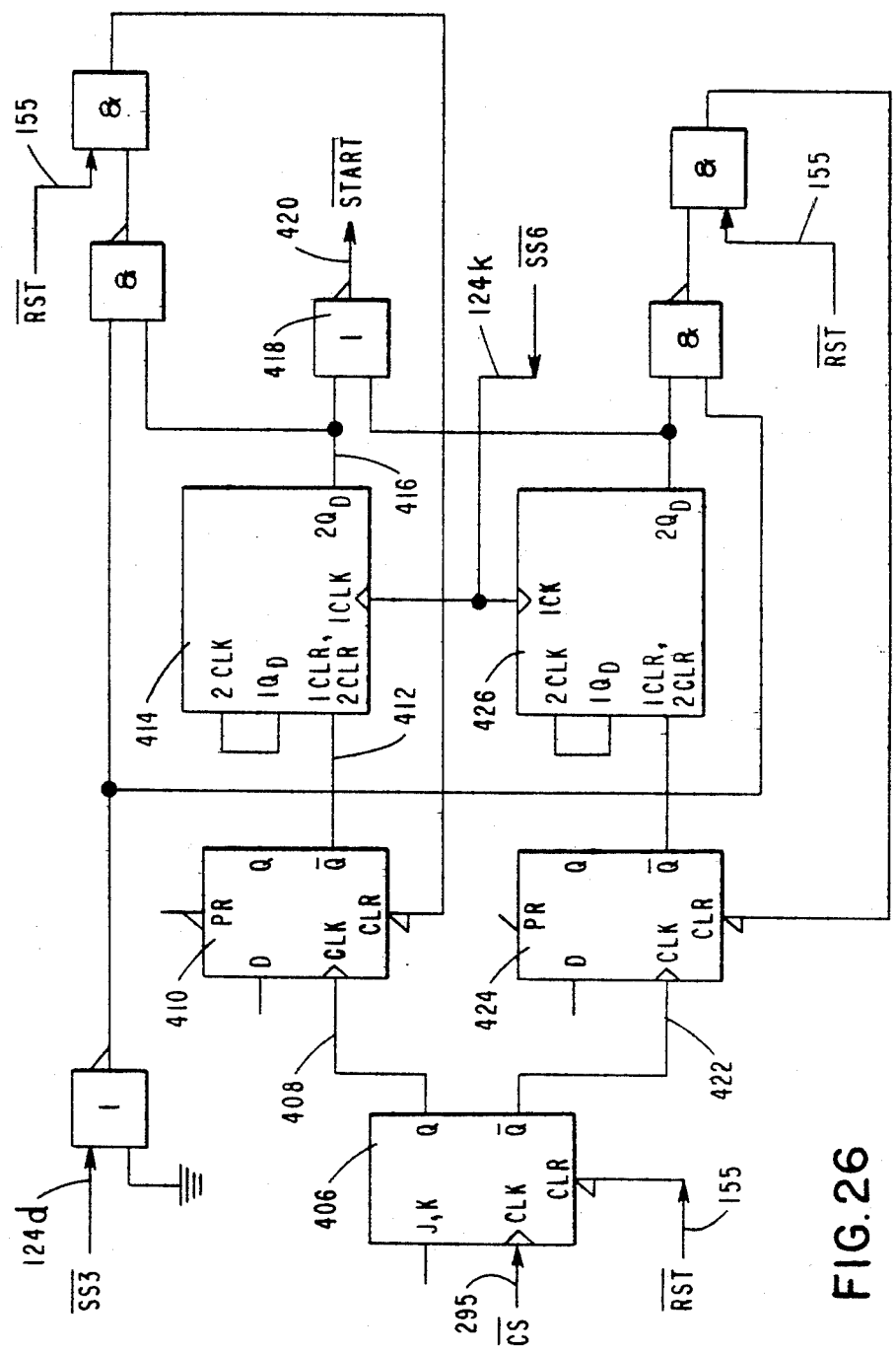
FIG. 26 is a diagram of a logic circuit for generating the character start signal.

Referring now to FIG. 26, there is shown the logic circuit for outputting the delayed character start signal $\overline{START}$ to the image extraction unit 58. Included in the circuit is a 74LS74 flip-flop 406 which is clocked by the character start signal $\overline{CS}$ appearing on line 295. Clocking of the flip-flop 406 outputs a high signal over line 408 which clocks a second 74LS74 flip-flop 410 whose $\overline{Q}$ output signal appearing on line 412 enables a 74LS393 counter 414. Upon reaching a count of 128 indicating that the data bit stream has reached the output of the shift registers 392a–392e inclusive (FIGS. 28A–28C inclusive), a high signal will be outputted over line 416 to a NOR gate 418 which outputs the low character start signal $\overline{START}$ over line 420 to the image extraction unit 58 (FIG. 1). When the next character start signal $\overline{CS}$ occurs on line 295, the flip-flop 406 will be clocked to output a high signal over the $\overline{Q}$ output line 422 which clocks a 74LS74 flip-flop 424. The clocking of the flip-flop 424 results in the operation of a second 74LS393 counter 426 (FIG. 26) which enables the NOR gate 418 to output the character start signal $\overline{START}$ over line 420 upon reaching a count of 128. The logic circuit elements are reset by system reset signal $\overline{RST}$ appearing on line 155 and the sequence control signal $\overline{SS3}$ appearing on line 124d (FIG. 7A).

In the operation of the system, the rectified data bits representing each channel of the read head 20 is inputted into the comparators 230a–230f (FIGS. 15A–15C inclusive) which applies a fixed threshold value to each seven bits of data comprising a window. The threshold data is then inputted into an EPROM member 258 (FIG. 20) which examines the data bits to determine if a character start requirement is met. If the corresponding windows in any of two channels are found to contain ink spots, the flip-flop 98 (FIG. 21A) will output a pre-character start signal PCS which controls the EPROM member 209 (FIG. 13C) to generate a dynamic threshold value based upon the maximum peak values found in the first window of each channel. The pre-character start signal PCS will enable the buffer members 132a–132e inclusive (FIGS. 9A and 9C) to output the delayed first windows of each channel to the peak value detector unit 104 (FIG. 5C) which generates values representing the peak value in each of the first windows of each channel. The EPROM member 209 (FIG. 13C) will divide the peak values found by a constant to output a dynamic threshold value which is then applied to the data bits found in each of the first windows by the comparators 230a–230f inclusive. The threshold values are then transmitted to the EPROM member 258 (FIG. 20) which again applies the character start requirements to the received data. If during the first seven bits of each channel examined, it is found that the character start requirements are met, the character start flip-flop 110 (FIG. 21B) will output the character start signal CS. If the requirements are not met during the processing of the first windows, the window counter 108 upon reaching a count of 14 representing the second window will preset the character start flip-flop 110 to output the character start signals CS and $\overline{CS}$. Once this occurs, the accumulated width of the character is transmitted to the EPROM member 336 (FIG. 22D) which generates a value representing the blank spaces which must follow the end of the character. If the blank spaces are sensed, the flip-flop 358 (FIG. 22C) is then operated to generate the character end signal CHEND. Marker signals are then inserted in the data bits being outputted to the image extraction logic circuit 58 indicating the start and end of the character.

The integrated circuit networks having a numerical designation disclosed herein are commercially available from the Texas Instruments Corporation of Dallas, Tex.

While the preferred embodiment of the invention has been described in detail for recognizing characters in a standard E-13B character font, the character recognition system could be easily adapted by a person of ordinary skill in the art to process characters and symbols from any standard character font without departing from the spirit of the invention. Furthermore, many of the changes and details of the preferred embodiment may be made without departing from the spirit or scope of the claims as defined in the appended claims.

We claim:

1. A method for establishing the location of an unknown character in a character recognition system comprising the steps:
   (1) generating a plurality of substantially parallel analog waveforms having varying peak voltage amplitudes and times of occurrence of same representing the configuration of the unknown character;
   (2) generating a plurality of first digital values representing the voltage amplitudes in each of the analog waveforms;
   (3) applying a first threshold value to said first digital values for generating a plurality of second digital values representing the unknown character and the background of the character;
   (4) detecting the start of the unknown character from the second digital values;
   (5) generating a second threshold value from said first digital values;
   (6) applying said second threshold value to said first digital values for generating third digital values representing the unknown character and fourth digital values representing the background area of the unknown character;
   (7) detecting the start of the unknown character from the third and fourth digital values;
   (8) and detecting the end of the unknown character from the third and fourth digital values.

2. The method of claim 1 in which the step of generating a second threshold value comprises the steps of detecting the first digital value having the maximum values and dividing the maximum value by a constant.

3. The method of claim 1 in which the step of detecting the end of the character comprises the steps of:
   counting the number of third digital values representing the width of the unknown character;
   generating the number of fourth digital values representing the background of the character which must follow the end of the character;
   counting the number of fourth digital values which follow the end of the character;
   and outputting a signal indicating the end of the character upon the number of fourth digital values required to follow the character being equal to the number counted.

4. A method for establishing the start of a symbol represented by a plurality of analog waveforms having peak voltage amplitudes and times of occurrence of same comprising the steps of:
   sampling portions of each analog waveform to generate first binary values representing the voltage amplitude of each portion;
   comparing each of the first binary values with a first threshold value to provide second binary values representing the voltage amplitude of each portion which exceeds the threshold value;
   examining the second binary values for the start of the symbol;
   examining the first binary values to find the maximum binary value upon finding the start of a symbol;
   dividing the maximum binary value by a constant to produce a second threshold value;
   comparing the first binary values with the second threshold value to produce third binary values representing the symbol and fourth binary values representing the background of the symbol;
   and examining the third and fourth binary values for the location of the start of the symbol.

5. The method of claim 4 which further includes the steps of:
   counting the number of third binary values which comprise the width of the symbol;
   counting the number of fourth binary values which follow the end of the symbol;
   generating the number of fourth binary values required to follow the end of the symbol in accordance with the number of third binary values counted;
   comparing the number of fourth binary values required to follow the symbol with the number counted;
   and outputting a signal enabling the symbol to be recognized in response to finding a coincidence between the number of fourth binary values.

6. A method for processing data derived from a plurality of analog waveforms having a sequence of varying peak voltage amplitudes and time of occurrence of same corresponding to the configuration of a character being recognized comprising the steps of:

sampling portions of each analog waveform to generate a plurality of rows of first binary data bits whose value represents the voltage amplitude of each portion;

comparing the value represented by said first binary bits with a first threshold value to produce second binary data bits representing the voltage amplitude of each portion compared which exceeds the first threshold value and third binary data bits which do not exceed the first threshold value;

examining the number and location of each of said second and third binary data bits in each row;

outputting a first signal indicating the start of the character upon finding that there are five consecutive second binary data bits out of the first seven data bits in any row or that the first or seventh binary data bit of the row is a second binary data bit;

examining the values of the second and third binary data bits in each row to find the maximum value in response to the outputting of said first signal;

dividing the maximum value by a constant to output a second threshold value;

comparing the value represented by the second and third binary data bits with said second threshold value to produce fourth binary data bits representing a character and fifth binary data bits representing the background of the character;

examining the number and location of each of said fourth binary data bits;

and outputting a second signal representing the finding of the start of the character upon sensing that five of the first seven binary data bits examined are said fourth binary data bits.

7. The mehtod of claim 6 which further includes the steps of:

counting the number of fourth binary data bits comprising the width of the character;

counting the number of fifth binary data bits that follow the end of the character;

generating the number of fifth binary data bits required to follow the end of the character in accordance with the number of fourth binary data bits counted;

comparing the required number of fourth binary data bits with the number of fourth binary data bits counted;

and outputting a third signal enabling the character to be recognized in response to the finding of a coincidence between the required number of fifth binary data bits and the number of fifth binary data bits counted.

8. A system for processing signals representing feature characteristics of an unknown character comprising:

first means for generating a plurality of adjacent parallel rows of first and second feature characteristic signals in which the first feature characteristic signals represents a feature characteristic of an unknown character and said second feature characteristic signals represents the background of the unknown character;

first means for detecting a first predetermined number of consecutive first feature characteristic signals in two adjacent rows representing the start of the unknown character, said detecting means outputting a first control signal in response to detecting said first predetermined number of first feature characteristic signals;

means for counting the number of first feature characteristic signals representing the width of the unknown character;

and second means for detecting a second predetermined number of said second feature characteristic signals located adjacent the end of said first feature characteristic signals, said second predetermined number being inversely proportional to the number of first feature characteristic signals in the width of the unknown character, said second detecting means outputting a second control signal in response to detecting said second predetermined number whereby a utilization device receives said first and second control signals enabling said utilization device to process said first and second feature characteristic signals.

9. The system of claim 8 in which said first generating means includes:

a multi-channel sensing member for generating a plurality of concurrent voltage signals each having an analog waveform unique to the unknown character, said waveforms including a sequence of varying peak amplitudes;

means connected to said sensing member for converting each of said analog waveforms into a plurality of first digital signals having a signal level corresponding to the peak amplitudes of the analog waveform;

means for comparing the signal level of said first digital signals with a first reference signal level to output a first data signal when the signal level of said first digital signals exceeds said first reference signal level and a second data signal when the signal level of said first digital signals does not exceed the reference signal level;

means for examining said first and second data signals to output a third control signal upon finding a predetermined number of consecutive first data signals;

and means connected to said comparing means and enabled by said third control signal for generating a second reference signal level in accordance with the signal level of said first data signals whereby said comparing means compares the signal level of said first data signals with said second reference signal level to output said first feature characteristic signals when the signals level of one of said first data signals exceeds said second reference signal level and said second feature characteristic signal when it does not exceed the second reference signal level.

10. The system of claim 9 in which said generating means includes third detecting means for detecting the maximum signal level of said first digital signals and first memory means connected to said comparing means and said third detecting means includes means for dividing the maximum signal level detected by a constant to output a second reference signal level to said comparing means.

11. The system of claim 10 in which said examining means includes second memory means connected to said comparing means and adapted to output a fourth control signal upon finding a predetermined number of consecutive first data signals outputted by said comparing means and first logic circuit means connected to said second memory means for outputting said third control signal in response to receiving said fourth control signal.

12. The system of claim 11 in which said first and second memory means each comprises a ROM memory device.

13. The system of claim 12 in which said first detecting means includes first counter means for counting the number of said first and second feature characteristic signals and second logic circuit means connected to said counter means and said second memory means for outputting said first control signal upon the generation of said fourth control signal.

14. The system of claim 13 in which said first counter means is adapted to output a fifth control signal to said second logic circuit means upon reaching a predetermined count whereby said second logic circuit means will output said first control signal upon receiving said fifth control signal.

15. The system of claim 14 in which said second detecting means includes third generating means for generating a first binary signal representing the width of the character sensed, third memory means connected to said third generating means for outputting second binary signals representing the width of the background area which is required to follow the width of the character sensed and fourth means for generating a sixth control signal indicating the end of the character upon the value of the second binary signal equalling the value of the first binary signal.

16. The system of claim 15 in which said third generating means includes second counter means connected to said second logic circuit means for counting the number of consecutive first feature characteristic signals in response to the generation of said first control signal, fourth detecting means for detecting the transition between the generation of said first and second feature characteristic signals and means for outputting the count of said second counter means as the width of the character sensed in response to the detection of the end of the character by said fourth detecting means.

17. The system of claim 16 in which said second detecting means further includes third counter means connected to said third memory means, said third counter means being preset to a value represented by said second binary signals and operated to downcount said second feature characteristic signals to output a seventh control signal upon reaching the value of zero and third logic circuit means connected to said third counter means to output an eighth control signal in response to receiving said seventh control signal indicating the position of the end of the character in said feature characteristic signals.

* * * * *